United States Patent
Hoffberg

(10) Patent No.: US 8,971,519 B1
(45) Date of Patent: *Mar. 3, 2015

(54) AGENT TRAINING SENSITIVE CALL ROUTING SYSTEM

(71) Applicant: Steven Hoffberg, West Harrison, NY (US)

(72) Inventor: Steven Hoffberg, West Harrison, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/067,140

(22) Filed: Oct. 30, 2013

Related U.S. Application Data

(63) Continuation of application No. 13/073,559, filed on Mar. 28, 2011, now Pat. No. 8,582,753, which is a continuation of application No. 11/532,883, filed on Sep. 18, 2006, now Pat. No. 7,916,858, which is a continuation of application No. 10/180,763, filed on Jun. 25, 2002, now Pat. No. 7,110,525.

(60) Provisional application No. 60/300,684, filed on Jun. 25, 2001.

(51) Int. Cl.
  H04M 5/00 (2006.01)
  H04M 3/523 (2006.01)
(52) U.S. Cl.
  CPC .................................. H04M 3/523 (2013.01)
  USPC ............ 379/265.11; 379/265.01; 379/265.12
(58) Field of Classification Search
  USPC ........ 379/265.01–265.14, 266.01–266.1, 309
  See application file for complete search history.

(56) References Cited

U.S. PATENT DOCUMENTS

| | | |
|---|---|---|
| 4,048,452 A | 9/1977 | Oehring et al. |
| 4,286,118 A | 8/1981 | Mehaffey et al. |
| 4,677,663 A | 6/1987 | Szlam |
| 4,737,983 A | 4/1988 | Frauenthal et al. |
| 4,757,529 A | 7/1988 | Glapa et al. |
| 4,768,221 A | 8/1988 | Green et al. |
| 4,797,911 A | 1/1989 | Szlam et al. |
| 4,805,215 A | 2/1989 | Miller |
| 4,807,279 A | 2/1989 | McClure et al. |
| 4,831,551 A | 5/1989 | Schalk et al. |
| 4,852,149 A | 7/1989 | Zwick et al. |
| 4,866,754 A | 9/1989 | Hashimoto |
| 4,878,243 A | 10/1989 | Hashimoto |
| 4,893,301 A | 1/1990 | Andrews et al. |
| 4,894,857 A | 1/1990 | Szlam et al. |
| 4,924,501 A | 5/1990 | Cheeseman et al. |
| 4,930,150 A | 5/1990 | Katz |
| 4,933,964 A | 6/1990 | Girgis |
| 4,935,956 A | 6/1990 | Hellwarth et al. |
| 4,941,168 A | 7/1990 | Kelly, Jr. |
| 4,953,204 A | 8/1990 | Cuschleg, Jr. et al. |
| 4,958,371 A | 9/1990 | Damoci et al. |
| 4,975,841 A | 12/1990 | Kehnemuyi et al. |
| 4,977,595 A | 12/1990 | Ohta et al. |

(Continued)

Primary Examiner — William Deane, Jr.
(74) Attorney, Agent, or Firm — Steven M. Hoffberg; Ostrolenk Faber LLP

(57) ABSTRACT

A call-management method and system for distributing calls to agents, wherein each agent has a profile, e.g., defining agent skills, efficiency, etc. The call center management system implements an algorithm for selecting an agent to receive a call to optimize caller utility, call center efficiency, and agent training. Therefore, the algorithm does not seek to necessarily route a call to the agent having the skill set most suited to the call; rather, the call may be routed to an agent who needs experience in the area of the call, and thus serves as a training exercise. Skilled agents may be made available to shadow the training agent when available.

20 Claims, 4 Drawing Sheets

(56) References Cited

U.S. PATENT DOCUMENTS

| | | |
|---|---|---|
| 4,979,171 A | 12/1990 | Ashley |
| 4,987,587 A | 1/1991 | Jolissaint |
| 4,989,248 A | 1/1991 | Schalk et al. |
| 4,998,272 A | 3/1991 | Hawkins, Jr. et al. |
| 5,007,000 A | 4/1991 | Baldi |
| 5,007,078 A | 4/1991 | Masson et al. |
| 5,014,298 A | 5/1991 | Katz |
| 5,016,270 A | 5/1991 | Katz |
| 5,020,095 A | 5/1991 | Morganstein et al. |
| 5,020,097 A | 5/1991 | Tanaka et al. |
| 5,020,411 A | 6/1991 | Rowan |
| 5,036,535 A | 7/1991 | Gechter et al. |
| 5,040,208 A | 8/1991 | Jolissaint |
| 5,048,075 A | 9/1991 | Katz |
| 5,063,522 A | 11/1991 | Winters |
| 5,070,525 A | 12/1991 | Szlam et al. |
| 5,070,526 A | 12/1991 | Richmond et al. |
| 5,073,890 A | 12/1991 | Danielsen |
| 5,073,929 A | 12/1991 | Katz |
| 5,077,789 A | 12/1991 | Clark, Jr. et al. |
| 5,081,711 A | 1/1992 | Rickman, Jr. |
| 5,097,528 A | 3/1992 | Gursahaney et al. |
| 5,103,449 A | 4/1992 | Jolissaint |
| 5,121,422 A | 6/1992 | Kudo |
| 5,128,984 A | 7/1992 | Katz |
| 5,161,181 A | 11/1992 | Zwick |
| 5,163,083 A | 11/1992 | Dowden et al. |
| 5,163,087 A | 11/1992 | Kaplan |
| 5,164,981 A | 11/1992 | Mitchell et al. |
| 5,166,974 A | 11/1992 | Morganstein et al. |
| 5,168,517 A | 12/1992 | Waldman |
| 5,177,684 A | 1/1993 | Harker et al. |
| 5,185,786 A | 2/1993 | Zwick |
| 5,193,110 A | 3/1993 | Jones et al. |
| 5,206,903 A | 4/1993 | Kohler et al. |
| 5,214,688 A | 5/1993 | Szlam et al. |
| 5,218,635 A | 6/1993 | Bonvallet et al. |
| 5,224,153 A | 6/1993 | Katz |
| 5,237,159 A | 8/1993 | Stephens et al. |
| 5,237,514 A | 8/1993 | Curtin |
| 5,239,574 A | 8/1993 | Brandman et al. |
| 5,251,252 A | 10/1993 | Katz |
| 5,253,289 A | 10/1993 | Tanaka |
| 5,257,369 A | 10/1993 | Skeen et al. |
| 5,276,732 A | 1/1994 | Stent et al. |
| 5,278,898 A | 1/1994 | Cambray et al. |
| 5,280,425 A | 1/1994 | Hogge |
| 5,283,818 A | 2/1994 | Klausner et al. |
| 5,289,530 A | 2/1994 | Reese |
| 5,297,146 A | 3/1994 | Ogawa |
| 5,297,195 A | 3/1994 | Thorne et al. |
| 5,309,504 A | 5/1994 | Morganstein |
| 5,309,505 A | 5/1994 | Szlam et al. |
| 5,309,513 A | 5/1994 | Rose |
| 5,311,574 A | 5/1994 | Livanos |
| 5,311,577 A | 5/1994 | Madrid et al. |
| 5,313,516 A | 5/1994 | Afshar et al. |
| 5,319,703 A | 6/1994 | Drory |
| 5,321,745 A | 6/1994 | Drory et al. |
| 5,325,292 A | 6/1994 | Crockett |
| 5,327,490 A | 7/1994 | Cave |
| 5,329,579 A | 7/1994 | Brunson |
| 5,333,190 A | 7/1994 | Eyster |
| 5,339,392 A | 8/1994 | Risberg et al. |
| 5,341,412 A | 8/1994 | Ramot et al. |
| 5,341,414 A | 8/1994 | Popke |
| 5,351,285 A | 9/1994 | Katz |
| 5,359,645 A | 10/1994 | Katz |
| 5,365,575 A | 11/1994 | Katz |
| 5,369,695 A | 11/1994 | Chakravarti et al. |
| 5,381,470 A | 1/1995 | Cambray et al. |
| 5,390,236 A | 2/1995 | Klausner et al. |
| 5,392,353 A | 2/1995 | Morales |
| 5,400,393 A | 3/1995 | Knuth et al. |
| 5,402,474 A | 3/1995 | Miller et al. |
| 5,420,852 A | 5/1995 | Anderson et al. |
| 5,420,919 A | 5/1995 | Arnaud et al. |
| 5,425,093 A | 6/1995 | Trefzger |
| 5,430,792 A | 7/1995 | Jesurum et al. |
| 5,432,835 A | 7/1995 | Hashimoto |
| 5,434,906 A | 7/1995 | Robinson et al. |
| 5,434,913 A | 7/1995 | Tung et al. |
| 5,436,967 A | 7/1995 | Hanson |
| 5,442,693 A | 8/1995 | Hays et al. |
| 5,448,624 A | 9/1995 | Hardy et al. |
| 5,448,631 A | 9/1995 | Cain |
| 5,459,781 A | 10/1995 | Kaplan et al. |
| 5,465,286 A | 11/1995 | Clare et al. |
| 5,467,391 A | 11/1995 | Donaghue, Jr. et al. |
| 5,479,487 A | 12/1995 | Hammond |
| 5,479,501 A | 12/1995 | Lai |
| 5,481,596 A | 1/1996 | Comerford |
| 5,485,506 A | 1/1996 | Recht et al. |
| 5,487,168 A | 1/1996 | Geiner et al. |
| 5,488,570 A | 1/1996 | Agarwal |
| 5,490,247 A | 2/1996 | Tung et al. |
| 5,493,690 A | 2/1996 | Shimazaki |
| 5,495,419 A | 2/1996 | Rostoker et al. |
| 5,495,523 A | 2/1996 | Stent et al. |
| 5,495,528 A | 2/1996 | Dunn et al. |
| 5,502,688 A | 3/1996 | Recchione et al. |
| 5,502,762 A | 3/1996 | Andrew et al. |
| 5,506,898 A | 4/1996 | Costantini et al. |
| 5,506,954 A | 4/1996 | Arshi et al. |
| 5,508,942 A | 4/1996 | Agarwal |
| 5,511,003 A | 4/1996 | Agarwal |
| 5,511,112 A | 4/1996 | Szlam |
| 5,511,117 A | 4/1996 | Zazzera |
| 5,511,121 A | 4/1996 | Yacobi |
| 5,515,296 A | 5/1996 | Agarwal |
| 5,515,421 A | 5/1996 | Sikand et al. |
| 5,517,566 A | 5/1996 | Smith et al. |
| 5,519,773 A | 5/1996 | Dumas et al. |
| 5,524,140 A | 6/1996 | Klausner et al. |
| 5,524,147 A | 6/1996 | Bean |
| 5,526,417 A | 6/1996 | Dezonno |
| 5,528,666 A | 6/1996 | Weigand et al. |
| 5,530,931 A | 6/1996 | Cook-Hellberg et al. |
| 5,533,103 A | 7/1996 | Peavey et al. |
| 5,533,107 A | 7/1996 | Irwin et al. |
| 5,533,109 A | 7/1996 | Baker |
| 5,535,257 A | 7/1996 | Goldberg et al. |
| 5,537,470 A | 7/1996 | Lee |
| 5,544,220 A | 8/1996 | Trefzger |
| 5,544,232 A | 8/1996 | Baker et al. |
| 5,546,452 A | 8/1996 | Andrews et al. |
| 5,546,456 A | 8/1996 | Vilsoet et al. |
| 5,555,290 A | 9/1996 | McLeod et al. |
| 5,555,295 A | 9/1996 | Bhusri |
| 5,557,533 A | 9/1996 | Koford et al. |
| 5,557,668 A | 9/1996 | Brady |
| 5,557,798 A | 9/1996 | Skeen et al. |
| 5,559,867 A | 9/1996 | Langsenkamp et al. |
| 5,559,878 A | 9/1996 | Keys et al. |
| 5,560,011 A | 9/1996 | Uyama |
| 5,561,711 A | 10/1996 | Muller |
| 5,568,540 A | 10/1996 | Greco et al. |
| 5,570,419 A | 10/1996 | Cave et al. |
| 5,572,576 A | 11/1996 | Klausner et al. |
| 5,572,586 A | 11/1996 | Ouchi |
| 5,574,784 A | 11/1996 | LaPadula et al. |
| 5,577,112 A | 11/1996 | Cambray et al. |
| 5,579,377 A | 11/1996 | Rogers |
| 5,579,383 A | 11/1996 | Bales et al. |
| 5,581,602 A | 12/1996 | Szlam et al. |
| 5,581,604 A | 12/1996 | Robinson et al. |
| 5,581,607 A | 12/1996 | Richardson, Jr. et al. |
| 5,586,179 A | 12/1996 | Stent et al. |
| 5,588,049 A | 12/1996 | Detering et al. |
| 5,590,171 A | 12/1996 | Howe et al. |
| 5,590,188 A | 12/1996 | Crockett |
| 5,592,543 A | 1/1997 | Smith et al. |
| 5,594,790 A | 1/1997 | Curreri et al. |
| 5,594,791 A | 1/1997 | Szlam et al. |

(56) References Cited

U.S. PATENT DOCUMENTS

| | | |
|---|---|---|
| 5,600,710 A | 2/1997 | Weisser, Jr. et al. |
| 5,610,774 A | 3/1997 | Hayashi et al. |
| 5,610,978 A | 3/1997 | Purits |
| 5,619,557 A | 4/1997 | Van Berkum |
| 5,621,201 A | 4/1997 | Langhans et al. |
| 5,623,547 A | 4/1997 | Jones et al. |
| 5,625,676 A | 4/1997 | Greco et al. |
| 5,625,682 A | 4/1997 | Gray et al. |
| 5,633,917 A | 5/1997 | Rogers |
| 5,633,922 A | 5/1997 | August et al. |
| 5,633,924 A | 5/1997 | Kaish et al. |
| 5,636,125 A | 6/1997 | Rostoker et al. |
| 5,636,267 A | 6/1997 | Utsumi et al. |
| 5,636,268 A | 6/1997 | Dijkstra et al. |
| 5,638,436 A | 6/1997 | Hamilton et al. |
| 5,638,498 A | 6/1997 | Tyler et al. |
| 5,640,468 A | 6/1997 | Hsu |
| 5,646,986 A | 7/1997 | Sahni et al. |
| 5,646,988 A | 7/1997 | Hikawa |
| 5,649,068 A | 7/1997 | Boser et al. |
| 5,652,788 A | 7/1997 | Hara |
| 5,655,013 A | 8/1997 | Gainsboro |
| 5,655,014 A | 8/1997 | Walsh et al. |
| 5,657,074 A | 8/1997 | Ishibe et al. |
| 5,661,283 A | 8/1997 | Gallacher et al. |
| 5,666,416 A | 9/1997 | Micali |
| 5,671,086 A | 9/1997 | Parvin et al. |
| 5,675,637 A | 10/1997 | Szlam et al. |
| 5,677,955 A | 10/1997 | Doggett et al. |
| 5,679,940 A | 10/1997 | Templeton et al. |
| 5,682,322 A | 10/1997 | Boyle et al. |
| 5,684,863 A | 11/1997 | Katz |
| 5,687,225 A | 11/1997 | Jorgensen |
| 5,692,033 A | 11/1997 | Farris |
| 5,692,034 A | 11/1997 | Richardson, Jr. et al. |
| 5,696,809 A | 12/1997 | Voit |
| 5,696,818 A | 12/1997 | Doremus et al. |
| 5,696,908 A | 12/1997 | Muehlberger et al. |
| 5,699,418 A | 12/1997 | Jones |
| 5,701,295 A | 12/1997 | Bales et al. |
| 5,703,935 A | 12/1997 | Raissyan et al. |
| 5,715,307 A | 2/1998 | Zazzera |
| 5,717,741 A | 2/1998 | Yue et al. |
| 5,717,757 A | 2/1998 | Micali |
| 5,719,794 A | 2/1998 | Altshuler et al. |
| RE35,758 E | 3/1998 | Winter et al. |
| 5,724,418 A | 3/1998 | Brady |
| 5,727,154 A | 3/1998 | Fry et al. |
| 5,729,600 A | 3/1998 | Blaha et al. |
| 5,740,233 A | 4/1998 | Cave et al. |
| 5,740,240 A | 4/1998 | Jolissaint |
| 5,742,510 A | 4/1998 | Rostoker et al. |
| 5,742,675 A | 4/1998 | Kilander et al. |
| 5,745,363 A | 4/1998 | Rostoker et al. |
| 5,748,711 A | 5/1998 | Scherer |
| 5,754,939 A | 5/1998 | Herz et al. |
| 5,761,285 A | 6/1998 | Stent |
| 5,768,355 A | 6/1998 | Salibrici et al. |
| 5,768,360 A | 6/1998 | Reynolds et al. |
| 5,768,385 A | 6/1998 | Simon |
| 5,774,357 A | 6/1998 | Hoffberg et al. |
| 5,774,537 A | 6/1998 | Kim |
| 5,774,730 A | 6/1998 | Aizikowitz et al. |
| 5,781,439 A | 7/1998 | Rostoker et al. |
| 5,784,066 A | 7/1998 | Aizikowitz et al. |
| 5,784,616 A | 7/1998 | Horvitz |
| 5,787,156 A | 7/1998 | Katz |
| 5,787,159 A | 7/1998 | Hamilton et al. |
| 5,790,935 A | 8/1998 | Payton |
| 5,793,644 A | 8/1998 | Koford et al. |
| 5,793,846 A | 8/1998 | Katz |
| 5,793,868 A | 8/1998 | Micali |
| 5,796,791 A | 8/1998 | Polcyn |
| 5,796,816 A | 8/1998 | Utsumi |
| 5,799,077 A | 8/1998 | Yoshii |
| 5,799,087 A | 8/1998 | Rosen |
| 5,806,061 A | 9/1998 | Chaudhuri et al. |
| 5,806,071 A | 9/1998 | Balderrama et al. |
| 5,812,642 A | 9/1998 | Leroy |
| 5,812,668 A | 9/1998 | Weber |
| 5,815,403 A | 9/1998 | Jones et al. |
| 5,815,551 A | 9/1998 | Katz |
| 5,815,554 A | 9/1998 | Burgess et al. |
| 5,815,566 A | 9/1998 | Ramot et al. |
| 5,815,657 A | 9/1998 | Williams et al. |
| 5,822,400 A | 10/1998 | Smith |
| 5,822,401 A | 10/1998 | Cave et al. |
| 5,822,410 A | 10/1998 | McCausland et al. |
| 5,825,869 A | 10/1998 | Brooks et al. |
| 5,828,731 A | 10/1998 | Szlam et al. |
| 5,828,734 A | 10/1998 | Katz |
| 5,828,840 A | 10/1998 | Cowan et al. |
| 5,832,089 A | 11/1998 | Kravitz et al. |
| 5,835,572 A | 11/1998 | Richardson, Jr. et al. |
| 5,835,896 A | 11/1998 | Fisher et al. |
| 5,838,583 A | 11/1998 | Varadarajan et al. |
| 5,838,772 A | 11/1998 | Wilson et al. |
| 5,838,779 A | 11/1998 | Fuller et al. |
| 5,839,119 A | 11/1998 | Krsul et al. |
| 5,841,852 A | 11/1998 | He |
| 5,848,143 A | 12/1998 | Andrews et al. |
| 5,850,385 A | 12/1998 | Esaki |
| 5,850,428 A | 12/1998 | Day |
| 5,850,446 A | 12/1998 | Berger et al. |
| 5,850,617 A | 12/1998 | Libby |
| 5,854,832 A | 12/1998 | Dezonno |
| 5,857,013 A | 1/1999 | Yue et al. |
| 5,857,023 A | 1/1999 | Demers et al. |
| 5,867,386 A | 2/1999 | Hoffberg et al. |
| 5,867,559 A | 2/1999 | Jorgensen et al. |
| 5,867,564 A | 2/1999 | Bhusri |
| 5,867,572 A | 2/1999 | MacDonald et al. |
| 5,867,799 A | 2/1999 | Lang et al. |
| 5,870,313 A | 2/1999 | Boyle et al. |
| 5,870,464 A | 2/1999 | Brewster et al. |
| 5,870,564 A | 2/1999 | Jensen et al. |
| 5,872,833 A | 2/1999 | Scherer |
| 5,875,108 A | 2/1999 | Hoffberg et al. |
| 5,875,117 A | 2/1999 | Jones et al. |
| 5,878,126 A | 3/1999 | Velamuri et al. |
| 5,878,130 A | 3/1999 | Andrews et al. |
| 5,884,277 A | 3/1999 | Khosla |
| 5,889,862 A | 3/1999 | Ohta et al. |
| 5,889,863 A | 3/1999 | Weber |
| 5,890,138 A | 3/1999 | Godin et al. |
| 5,893,902 A | 4/1999 | Transue et al. |
| 5,894,505 A | 4/1999 | Koyama |
| 5,896,446 A | 4/1999 | Sagady et al. |
| 5,898,154 A | 4/1999 | Rosen |
| 5,898,759 A | 4/1999 | Huang |
| 5,898,762 A | 4/1999 | Katz |
| 5,901,209 A | 5/1999 | Tannenbaum et al. |
| 5,901,214 A | 5/1999 | Shaffer et al. |
| 5,901,229 A | 5/1999 | Fujisaki et al. |
| 5,901,246 A | 5/1999 | Hoffberg et al. |
| 5,903,454 A | 5/1999 | Hoffberg et al. |
| 5,903,461 A | 5/1999 | Rostoker et al. |
| 5,903,641 A | 5/1999 | Tonisson |
| 5,903,651 A | 5/1999 | Kocher |
| 5,903,880 A | 5/1999 | Biffar |
| 5,905,792 A | 5/1999 | Miloslavsky |
| 5,905,975 A | 5/1999 | Ausubel |
| 5,905,979 A | 5/1999 | Barrows |
| 5,907,601 A | 5/1999 | David et al. |
| 5,907,608 A | 5/1999 | Shaffer et al. |
| 5,910,982 A | 6/1999 | Shaffer et al. |
| 5,912,947 A | 6/1999 | Langsenkamp et al. |
| 5,913,195 A | 6/1999 | Weeren et al. |
| 5,914,887 A | 6/1999 | Scepanovic et al. |
| 5,914,951 A | 6/1999 | Bentley et al. |
| 5,915,011 A | 6/1999 | Miloslavsky |
| 5,915,093 A | 6/1999 | Berlin et al. |
| 5,917,893 A | 6/1999 | Katz |
| 5,917,903 A | 6/1999 | Jolissaint |

(56) References Cited

U.S. PATENT DOCUMENTS

| | | |
|---|---|---|
| 5,918,213 A | 6/1999 | Bernard et al. |
| 5,920,477 A | 7/1999 | Hoffberg et al. |
| 5,920,629 A | 7/1999 | Rosen |
| 5,923,745 A | 7/1999 | Hurd |
| 5,923,746 A | 7/1999 | Baker et al. |
| 5,924,016 A | 7/1999 | Fuller et al. |
| 5,926,528 A | 7/1999 | David |
| 5,926,539 A | 7/1999 | Shtivelman |
| 5,926,548 A | 7/1999 | Okamoto |
| 5,930,339 A | 7/1999 | Nepustil |
| 5,930,777 A | 7/1999 | Barber |
| 5,933,480 A | 8/1999 | Felger |
| 5,933,492 A | 8/1999 | Turovski |
| 5,933,498 A | 8/1999 | Schneck et al. |
| 5,937,055 A | 8/1999 | Kaplan |
| 5,937,390 A | 8/1999 | Hyodo |
| 5,937,394 A | 8/1999 | Wong et al. |
| 5,940,493 A | 8/1999 | Desai et al. |
| 5,940,496 A | 8/1999 | Gisby et al. |
| 5,940,497 A | 8/1999 | Miloslavsky |
| 5,940,813 A | 8/1999 | Hutchings |
| 5,940,947 A | 8/1999 | Takeuchi et al. |
| 5,943,403 A | 8/1999 | Richardson, Jr. et al. |
| 5,943,424 A | 8/1999 | Berger et al. |
| 5,946,387 A | 8/1999 | Miloslavsky |
| 5,946,388 A | 8/1999 | Walker et al. |
| 5,946,394 A | 8/1999 | Gambuzza |
| 5,946,669 A | 8/1999 | Polk |
| 5,949,045 A | 9/1999 | Ezawa et al. |
| 5,949,852 A | 9/1999 | Duncan |
| 5,949,854 A | 9/1999 | Sato |
| 5,949,863 A | 9/1999 | Tansky |
| 5,952,638 A | 9/1999 | Demers et al. |
| 5,953,332 A | 9/1999 | Miloslavsky |
| 5,953,405 A | 9/1999 | Miloslavsky |
| 5,956,392 A | 9/1999 | Tanigawa et al. |
| 5,956,397 A | 9/1999 | Shaffer et al. |
| 5,960,073 A | 9/1999 | Kikinis et al. |
| 5,960,083 A | 9/1999 | Micali |
| 5,963,632 A | 10/1999 | Miloslavsky |
| 5,963,635 A | 10/1999 | Szlam et al. |
| 5,963,648 A | 10/1999 | Rosen |
| 5,963,911 A | 10/1999 | Walker et al. |
| 5,963,924 A | 10/1999 | Williams et al. |
| 5,963,975 A | 10/1999 | Boyle et al. |
| 5,966,429 A | 10/1999 | Scherer |
| 5,966,531 A | 10/1999 | Skeen et al. |
| 5,970,132 A | 10/1999 | Brady |
| 5,970,134 A | 10/1999 | Highland et al. |
| 5,974,120 A | 10/1999 | Katz |
| 5,974,135 A | 10/1999 | Breneman et al. |
| RE36,416 E | 11/1999 | Szlam et al. |
| 5,978,465 A | 11/1999 | Corduroy et al. |
| 5,978,467 A | 11/1999 | Walker et al. |
| 5,978,471 A | 11/1999 | Bokinge |
| 5,978,840 A | 11/1999 | Nguyen et al. |
| 5,982,857 A | 11/1999 | Brady |
| 5,982,868 A | 11/1999 | Shaffer et al. |
| 5,983,208 A | 11/1999 | Haller et al. |
| 5,983,214 A | 11/1999 | Lang et al. |
| 5,987,115 A | 11/1999 | Petrunka et al. |
| 5,987,116 A | 11/1999 | Petrunka et al. |
| 5,987,118 A | 11/1999 | Dickerman et al. |
| 5,987,132 A | 11/1999 | Rowney |
| 5,987,140 A | 11/1999 | Rowney et al. |
| 5,991,391 A | 11/1999 | Miloslavsky |
| 5,991,392 A | 11/1999 | Miloslavsky |
| 5,991,393 A | 11/1999 | Kamen |
| 5,991,395 A | 11/1999 | Miloslavsky |
| 5,991,604 A | 11/1999 | Yi |
| 5,991,761 A | 11/1999 | Mahoney et al. |
| 5,995,614 A | 11/1999 | Miloslavsky |
| 5,995,615 A | 11/1999 | Miloslavsky |
| 5,995,948 A | 11/1999 | Whitford et al. |
| 5,995,997 A | 11/1999 | Horvitz |
| 5,996,076 A | 11/1999 | Rowney et al. |
| 5,999,908 A | 12/1999 | Abelow |
| 5,999,919 A | 12/1999 | Jarecki et al. |
| 5,999,965 A | 12/1999 | Kelly |
| 6,002,760 A | 12/1999 | Gisby |
| 6,002,767 A | 12/1999 | Kramer |
| 6,003,765 A | 12/1999 | Okamoto |
| 6,005,534 A | 12/1999 | Hylin et al. |
| 6,005,928 A | 12/1999 | Johnson |
| 6,005,931 A | 12/1999 | Neyman et al. |
| 6,005,939 A | 12/1999 | Fortenberry et al. |
| 6,006,218 A | 12/1999 | Breese et al. |
| 6,006,604 A | 12/1999 | Rabelo et al. |
| 6,009,149 A | 12/1999 | Langsenkamp |
| 6,009,452 A | 12/1999 | Horvitz |
| 6,011,845 A | 1/2000 | Nabkel et al. |
| 6,014,439 A | 1/2000 | Walker et al. |
| 6,016,344 A | 1/2000 | Katz |
| 6,016,475 A | 1/2000 | Miller et al. |
| 6,016,484 A | 1/2000 | Williams et al. |
| 6,018,579 A | 1/2000 | Petrunka |
| 6,018,724 A | 1/2000 | Arent |
| 6,018,738 A | 1/2000 | Breese et al. |
| 6,021,114 A | 2/2000 | Shaffer et al. |
| 6,021,190 A | 2/2000 | Fuller et al. |
| 6,021,202 A | 2/2000 | Anderson et al. |
| 6,021,399 A | 2/2000 | Demers et al. |
| 6,021,428 A | 2/2000 | Miloslavsky |
| 6,026,149 A | 2/2000 | Fuller et al. |
| 6,026,156 A | 2/2000 | Epler et al. |
| 6,026,379 A | 2/2000 | Haller et al. |
| 6,029,150 A | 2/2000 | Kravitz |
| 6,029,151 A | 2/2000 | Nikander |
| 6,029,161 A | 2/2000 | Lang et al. |
| 6,031,899 A | 2/2000 | Wu |
| 6,035,021 A | 3/2000 | Katz |
| 6,035,402 A | 3/2000 | Vaeth et al. |
| 6,041,116 A | 3/2000 | Meyers |
| 6,041,118 A | 3/2000 | Michel et al. |
| 6,044,075 A | 3/2000 | Le Boudec et al. |
| 6,044,135 A | 3/2000 | Katz |
| 6,044,146 A | 3/2000 | Gisby et al. |
| 6,044,149 A | 3/2000 | Shaham et al. |
| 6,044,355 A | 3/2000 | Crockett et al. |
| 6,044,368 A | 3/2000 | Powers |
| 6,047,067 A | 4/2000 | Rosen |
| 6,047,221 A | 4/2000 | Piche et al. |
| 6,047,269 A | 4/2000 | Biffar |
| 6,047,887 A | 4/2000 | Rosen |
| 6,049,599 A | 4/2000 | McCausland et al. |
| 6,049,786 A | 4/2000 | Smorodinsky |
| 6,049,787 A | 4/2000 | Takahashi et al. |
| 6,052,453 A | 4/2000 | Sagady et al. |
| 6,055,307 A | 4/2000 | Behnke et al. |
| 6,055,508 A | 4/2000 | Naor et al. |
| 6,057,872 A | 5/2000 | Candelore |
| 6,058,381 A | 5/2000 | Nelson |
| 6,058,435 A | 5/2000 | Sassin et al. |
| 6,061,347 A | 5/2000 | Hollatz et al. |
| 6,061,448 A | 5/2000 | Smith et al. |
| 6,061,665 A | 5/2000 | Bahreman |
| 6,063,028 A | 5/2000 | Luciano |
| 6,064,667 A | 5/2000 | Gisby et al. |
| 6,064,730 A | 5/2000 | Ginsberg |
| 6,064,731 A | 5/2000 | Flockhart et al. |
| 6,064,973 A | 5/2000 | Smith et al. |
| 6,065,675 A | 5/2000 | Teicher |
| 6,067,348 A | 5/2000 | Hibbeler |
| 6,067,565 A | 5/2000 | Horvitz |
| 6,067,572 A | 5/2000 | Jensen et al. |
| 6,070,142 A | 5/2000 | McDonough et al. |
| 6,072,864 A | 6/2000 | Shtivelman et al. |
| 6,072,870 A | 6/2000 | Nguyen et al. |
| 6,078,928 A | 6/2000 | Schnase et al. |
| 6,081,750 A | 6/2000 | Hoffberg et al. |
| 6,084,943 A | 7/2000 | Sunderman et al. |
| 6,085,226 A | 7/2000 | Horvitz |
| 6,086,626 A | 7/2000 | Jain et al. |
| 6,097,806 A | 8/2000 | Baker et al. |

(56) References Cited

U.S. PATENT DOCUMENTS

| | | |
|---|---|---|
| 6,098,069 A | 8/2000 | Yamaguchi |
| 6,102,958 A | 8/2000 | Meystel et al. |
| 6,102,970 A | 8/2000 | Kneipp |
| 6,104,801 A | 8/2000 | Miloslavsky |
| 6,110,214 A | 8/2000 | Klimasauskas |
| 6,112,181 A | 8/2000 | Shear et al. |
| 6,112,186 A | 8/2000 | Bergh et al. |
| 6,115,462 A | 9/2000 | Servi et al. |
| 6,115,693 A | 9/2000 | McDonough et al. |
| 6,118,865 A | 9/2000 | Gisby |
| 6,120,298 A | 9/2000 | Jenkins et al. |
| 6,122,358 A | 9/2000 | Shoji et al. |
| 6,122,360 A | 9/2000 | Neyman et al. |
| 6,122,364 A | 9/2000 | Petrunka et al. |
| 6,122,484 A | 9/2000 | Fuller et al. |
| 6,125,178 A | 9/2000 | Walker et al. |
| 6,125,398 A | 9/2000 | Mirashrafi et al. |
| 6,128,280 A | 10/2000 | Jamoussi et al. |
| 6,128,376 A | 10/2000 | Smith |
| 6,128,380 A | 10/2000 | Shaffer et al. |
| 6,130,937 A | 10/2000 | Fotta |
| 6,132,969 A | 10/2000 | Stoughton et al. |
| 6,134,530 A | 10/2000 | Bunting et al. |
| 6,135,396 A | 10/2000 | Whitfield et al. |
| 6,137,862 A | 10/2000 | Atkinson et al. |
| 6,137,870 A | 10/2000 | Scherer |
| 6,138,119 A | 10/2000 | Hall et al. |
| 6,144,737 A | 11/2000 | Maruyama et al. |
| 6,144,964 A | 11/2000 | Breese et al. |
| 6,146,026 A | 11/2000 | Ushiku |
| 6,147,975 A | 11/2000 | Bowman-Amuah |
| 6,148,065 A | 11/2000 | Katz |
| 6,151,387 A | 11/2000 | Katz |
| 6,151,424 A | 11/2000 | Hsu |
| 6,154,528 A | 11/2000 | Bennett, III et al. |
| 6,154,535 A | 11/2000 | Velamuri et al. |
| RE37,001 E | 12/2000 | Morganstein et al. |
| 6,155,725 A | 12/2000 | Scepanovic et al. |
| 6,157,655 A | 12/2000 | Shtivelman |
| 6,157,711 A | 12/2000 | Katz |
| 6,163,607 A | 12/2000 | Bogart et al. |
| 6,170,011 B1 | 1/2001 | Macleod Beck et al. |
| 6,170,742 B1 | 1/2001 | Yacoob |
| 6,173,052 B1 | 1/2001 | Brady |
| 6,174,671 B1 | 1/2001 | Anantharaman et al. |
| 6,175,563 B1 | 1/2001 | Miloslavsky |
| 6,175,564 B1 | 1/2001 | Miloslavsky et al. |
| 6,177,932 B1 | 1/2001 | Galdes et al. |
| 6,178,141 B1 | 1/2001 | Duckworth et al. |
| 6,178,240 B1 | 1/2001 | Walker et al. |
| 6,182,133 B1 | 1/2001 | Horvitz |
| 6,185,283 B1 | 2/2001 | Fuller et al. |
| 6,185,292 B1 | 2/2001 | Miloslavsky |
| 6,185,320 B1 | 2/2001 | Bick et al. |
| 6,185,683 B1 | 2/2001 | Ginter et al. |
| 6,188,965 B1 | 2/2001 | Mayo et al. |
| 6,192,121 B1 | 2/2001 | Atkinson et al. |
| 6,192,314 B1 | 2/2001 | Khavakh et al. |
| 6,192,413 B1 | 2/2001 | Lee et al. |
| 6,200,255 B1 | 3/2001 | Yu |
| 6,201,950 B1 | 3/2001 | Fuller et al. |
| 6,205,207 B1 | 3/2001 | Scherer |
| 6,208,970 B1 | 3/2001 | Ramanan |
| 6,212,178 B1 | 4/2001 | Beck et al. |
| 6,212,669 B1 | 4/2001 | Jain |
| 6,221,592 B1 | 4/2001 | Schwartz et al. |
| 6,223,165 B1 | 4/2001 | Lauffer |
| 6,226,287 B1 | 5/2001 | Brady |
| 6,226,289 B1 | 5/2001 | Williams et al. |
| 6,226,360 B1 | 5/2001 | Goldberg et al. |
| 6,229,888 B1 | 5/2001 | Miloslavsky |
| 6,230,197 B1 | 5/2001 | Beck et al. |
| 6,233,332 B1 | 5/2001 | Anderson et al. |
| 6,236,978 B1 | 5/2001 | Tuzhilin |
| 6,236,980 B1 | 5/2001 | Reese |
| 6,243,684 B1 | 6/2001 | Stuart et al. |
| 6,246,972 B1 | 6/2001 | Klimasauskas |
| 6,253,193 B1 | 6/2001 | Ginter et al. |
| 6,256,648 B1 | 7/2001 | Hill et al. |
| 6,266,649 B1 | 7/2001 | Linden et al. |
| 6,269,312 B1 | 7/2001 | Mayo et al. |
| 6,273,771 B1 | 8/2001 | Buckley et al. |
| 6,278,899 B1 | 8/2001 | Piche et al. |
| 6,298,303 B1 | 10/2001 | Khavakh et al. |
| 6,298,304 B1 | 10/2001 | Theimer |
| 6,301,687 B1 | 10/2001 | Jain et al. |
| 6,308,175 B1 | 10/2001 | Lang et al. |
| 6,314,420 B1 | 11/2001 | Lang et al. |
| 6,317,718 B1 | 11/2001 | Fano |
| 6,317,722 B1 | 11/2001 | Jacobi et al. |
| 6,317,731 B1 | 11/2001 | Luciano |
| 6,321,179 B1 | 11/2001 | Glance et al. |
| 6,321,221 B1 | 11/2001 | Bieganski |
| 6,327,590 B1 | 12/2001 | Chidlovskii et al. |
| 6,330,483 B1 | 12/2001 | Dailey |
| 6,333,979 B1 | 12/2001 | Bondi et al. |
| 6,333,980 B1 | 12/2001 | Hollatz et al. |
| 6,334,127 B1 | 12/2001 | Bieganski et al. |
| 6,334,131 B2 | 12/2001 | Chakrabarti et al. |
| 6,340,567 B1 | 1/2002 | Schwartz et al. |
| 6,345,264 B1 | 2/2002 | Breese et al. |
| 6,347,139 B1 | 2/2002 | Fisher et al. |
| 6,347,366 B1 | 2/2002 | Cousins |
| 6,353,813 B1 | 3/2002 | Breese et al. |
| 6,356,632 B1 | 3/2002 | Foster et al. |
| 6,356,890 B1 | 3/2002 | Agrawal et al. |
| 6,356,891 B1 | 3/2002 | Agrawal et al. |
| 6,356,899 B1 | 3/2002 | Chakrabarti et al. |
| 6,366,903 B1 | 4/2002 | Agrawal et al. |
| 6,381,504 B1 | 4/2002 | Havener et al. |
| 6,385,245 B1 | 5/2002 | De Haan et al. |
| 6,389,372 B1 | 5/2002 | Glance et al. |
| 6,400,996 B1 | 6/2002 | Hoffberg et al. |
| 6,404,920 B1 | 6/2002 | Hsu |
| 6,405,922 B1 | 6/2002 | Kroll |
| 6,408,064 B1 | 6/2002 | Fedorov et al. |
| 6,408,066 B1 | 6/2002 | Andruska et al. |
| 6,411,675 B1 | 6/2002 | Llacer |
| 6,412,012 B1 | 6/2002 | Bieganski et al. |
| 6,415,248 B1 | 7/2002 | Bangalore et al. |
| 6,418,424 B1 | 7/2002 | Hoffberg et al. |
| 6,421,709 B1 | 7/2002 | McCormick et al. |
| 6,430,558 B1 | 8/2002 | Delano |
| 6,446,035 B1 | 9/2002 | Grefenstette et al. |
| 6,449,367 B2 | 9/2002 | Van Wie et al. |
| 6,453,038 B1 | 9/2002 | McFarlane et al. |
| 6,459,784 B1 | 10/2002 | Humphrey et al. |
| 6,463,299 B1 | 10/2002 | Macor |
| 6,466,654 B1 | 10/2002 | Cooper et al. |
| 6,466,909 B1 | 10/2002 | Didcock |
| 6,466,970 B1 | 10/2002 | Lee et al. |
| 6,470,077 B1 | 10/2002 | Chan |
| 6,470,261 B1 | 10/2002 | Ng et al. |
| 6,477,245 B1 | 11/2002 | Chevet et al. |
| 6,477,246 B1 | 11/2002 | Dolan et al. |
| 6,477,494 B2 | 11/2002 | Hyde-Thomson et al. |
| 6,480,844 B1 | 11/2002 | Cortes et al. |
| 6,484,123 B2 | 11/2002 | Srivastava |
| 6,487,497 B2 | 11/2002 | Khavakh et al. |
| 6,487,533 B2 | 11/2002 | Hyde-Thomson et al. |
| 6,493,432 B1 | 12/2002 | Blum et al. |
| 6,493,658 B1 | 12/2002 | Koford et al. |
| 6,493,696 B1 | 12/2002 | Chazin |
| 6,496,568 B1 | 12/2002 | Nelson |
| 6,497,169 B1 | 12/2002 | Khosla |
| 6,510,220 B1 | 1/2003 | Beckett, II et al. |
| 6,510,221 B1 | 1/2003 | Fisher et al. |
| 6,513,029 B1 | 1/2003 | Agrawal et al. |
| 6,516,310 B2 | 2/2003 | Paulley |
| 6,519,259 B1 | 2/2003 | Baker et al. |
| 6,519,459 B1 | 2/2003 | Chavez, Jr. et al. |
| 6,522,726 B1 | 2/2003 | Hunt et al. |
| 6,529,870 B1 | 3/2003 | Mikkilineni |
| 6,529,891 B1 | 3/2003 | Heckerman |

(56) References Cited

U.S. PATENT DOCUMENTS

| | | |
|---|---|---|
| 6,536,935 B2 | 3/2003 | Parunak et al. |
| 6,546,378 B1 | 4/2003 | Cook |
| 6,549,782 B2 | 4/2003 | Roy |
| 6,560,360 B1 | 5/2003 | Neskovic et al. |
| 6,560,758 B1 | 5/2003 | Jain |
| 6,597,801 B1 | 7/2003 | Cham et al. |
| 6,607,888 B2 | 8/2003 | Schwartz et al. |
| 6,618,490 B1 | 9/2003 | Cham et al. |
| 6,618,716 B1 | 9/2003 | Horvitz |
| 6,621,424 B1 | 9/2003 | Brand |
| 6,622,160 B1 | 9/2003 | Horvitz |
| 6,633,544 B1 | 10/2003 | Rexford et al. |
| 6,646,572 B1 | 11/2003 | Brand |
| 6,678,611 B2 | 1/2004 | Khavakh et al. |
| 6,697,818 B2 | 2/2004 | Li et al. |
| 6,704,410 B1 | 3/2004 | McFarlane et al. |
| 6,708,120 B1 | 3/2004 | Mayo et al. |
| 6,714,967 B1 | 3/2004 | Horvitz |
| 6,721,337 B1 | 4/2004 | Kroeger et al. |
| 6,731,605 B1 | 5/2004 | Deshpande |
| 6,733,929 B2 | 5/2004 | Pierrat |
| 6,745,172 B1 | 6/2004 | Mancisidor et al. |
| 6,751,536 B1 | 6/2004 | Kipersztok et al. |
| 6,771,765 B1 | 8/2004 | Crowther et al. |
| 6,782,391 B1 | 8/2004 | Scher |
| 6,782,515 B2 | 8/2004 | Scott et al. |
| 6,792,356 B2 | 9/2004 | Mayo et al. |
| 6,795,567 B1 | 9/2004 | Cham et al. |
| 6,801,861 B2 | 10/2004 | Mayo et al. |
| 6,804,611 B2 | 10/2004 | Mayo et al. |
| 6,807,155 B1 | 10/2004 | Subramanian |
| 6,816,585 B1 | 11/2004 | Blatt et al. |
| 6,823,315 B1 | 11/2004 | Bucci et al. |
| 6,834,109 B1 | 12/2004 | Pare, Jr. et al. |
| 6,850,965 B2 | 2/2005 | Allen |
| 6,859,207 B2 | 2/2005 | Nougaret et al. |
| 6,873,610 B1 | 3/2005 | Noever |
| 6,879,926 B2 | 4/2005 | Schmit et al. |
| 6,898,205 B1 | 5/2005 | Chaskar et al. |
| 6,898,531 B2 | 5/2005 | Sheehan et al. |
| 6,904,328 B2 | 6/2005 | Rietman et al. |
| 6,917,932 B2 | 7/2005 | Chang et al. |
| 6,938,024 B1 | 8/2005 | Horvitz |
| 6,944,606 B2 | 9/2005 | Schmit et al. |
| 6,950,711 B2 | 9/2005 | Havener et al. |
| 6,950,754 B2 | 9/2005 | Mayo et al. |
| 6,953,024 B2 | 10/2005 | Linna et al. |
| 6,965,800 B2 | 11/2005 | Schmit et al. |
| 6,985,881 B2 | 1/2006 | Johnson et al. |
| 6,993,075 B2 | 1/2006 | Kim et al. |
| 7,003,484 B2 | 2/2006 | Keyes et al. |
| 7,028,005 B2 | 4/2006 | Messmer et al. |
| 7,031,936 B2 | 4/2006 | Johnson et al. |
| 7,035,937 B2 | 4/2006 | Haas et al. |
| 7,039,608 B2 | 5/2006 | Johnson et al. |
| 7,058,587 B1 | 6/2006 | Horne |
| 7,058,617 B1 | 6/2006 | Hartman et al. |
| 7,058,638 B2 | 6/2006 | Singh |
| 7,072,815 B1 | 7/2006 | Chaudhary et al. |
| 7,075,892 B2 | 7/2006 | Grover et al. |
| 7,082,411 B2 | 7/2006 | Johnson et al. |
| 7,083,879 B2 | 8/2006 | Pierrat et al. |
| 7,092,821 B2 | 8/2006 | Mizrahi et al. |
| 7,096,197 B2 | 8/2006 | Messmer et al. |
| 7,110,431 B2 | 9/2006 | Oates |
| 7,110,437 B2 | 9/2006 | Oates et al. |
| 7,110,440 B2 | 9/2006 | Oates et al. |
| 7,110,452 B2 | 9/2006 | Katsavounidis et al. |
| 7,110,525 B1 | 9/2006 | Heller et al. |
| 7,110,970 B2 | 9/2006 | Dingman et al. |
| 7,117,188 B2 | 10/2006 | Guyon et al. |
| 7,120,599 B2 | 10/2006 | Keyes |
| 7,120,865 B1 | 10/2006 | Horvitz et al. |
| 7,133,451 B2 | 11/2006 | Kim et al. |
| 7,162,445 B2 | 1/2007 | Johnson et al. |
| 7,164,706 B2 | 1/2007 | Oates |
| 7,165,043 B2 | 1/2007 | Keyes et al. |
| 7,171,383 B2 | 1/2007 | Johnson et al. |
| 7,171,385 B1 | 1/2007 | Dembo et al. |
| 7,177,799 B2 | 2/2007 | Calcagno et al. |
| 7,177,859 B2 | 2/2007 | Pather et al. |
| 7,187,790 B2 | 3/2007 | Sabol et al. |
| 7,194,681 B1 | 3/2007 | Horvitz |
| 7,203,221 B2 | 4/2007 | Oates |
| 7,210,062 B2 | 4/2007 | Oates et al. |
| 7,210,624 B1 | 5/2007 | Birjandi et al. |
| 7,218,668 B2 | 5/2007 | Oates et al. |
| 7,234,126 B2 | 6/2007 | Catthoor et al. |
| 7,248,623 B2 | 7/2007 | Oates |
| 7,263,538 B2 | 8/2007 | Hong |
| 7,272,613 B2 | 9/2007 | Sim et al. |
| 7,295,966 B2 | 11/2007 | Barklund et al. |
| 7,313,550 B2 | 12/2007 | Kulkarni et al. |
| 7,318,051 B2 | 1/2008 | Weston et al. |
| 7,327,780 B2 | 2/2008 | Oates et al. |
| 7,334,044 B1 | 2/2008 | Allen |
| 7,337,031 B1 | 2/2008 | Birjandi et al. |
| 7,343,311 B2 | 3/2008 | Ganesan et al. |
| 7,343,360 B1 | 3/2008 | Ristanovic et al. |
| 7,376,175 B2 | 5/2008 | Oates et al. |
| 7,444,269 B2 | 10/2008 | Drumheller |
| 7,453,922 B2 | 11/2008 | Oates et al. |
| 7,475,048 B2 | 1/2009 | Weston et al. |
| 7,490,085 B2 | 2/2009 | Walker et al. |
| 7,509,671 B1 | 3/2009 | Bedell et al. |
| 7,526,442 B2 | 4/2009 | Edgar et al. |
| 7,555,542 B1 | 6/2009 | Ayers et al. |
| 7,607,440 B2 | 10/2009 | Coste-Maniere et al. |
| 7,617,163 B2 | 11/2009 | Ben-Hur et al. |
| 7,676,594 B2 | 3/2010 | Fukasawa et al. |
| 7,822,658 B2 | 10/2010 | Casati et al. |
| 7,831,392 B2 | 11/2010 | Antoniotti et al. |
| 7,844,666 B2 | 11/2010 | Horvitz et al. |
| 7,870,240 B1 | 1/2011 | Horvitz |
| 7,916,858 B1 | 3/2011 | Heller et al. |
| 8,024,415 B2 | 9/2011 | Horvitz et al. |
| 8,522,192 B1 | 8/2013 | Avalos et al. |
| 8,582,753 B1 | 11/2013 | Heller et al. |

AGENT TRAINING SENSITIVE CALL ROUTING SYSTEM

RELATED APPLICATIONS

The present application is a continuation of U.S. patent application Ser. No. 13/073,559, filed Mar. 28, 2011, now U.S. Pat. No. 8,582,753, issued Nov. 12, 2013, which is a continuation of U.S. patent application Ser. No. 11/532,883, filed Sep. 18, 2006, now U.S. Pat. No. 7,916,858, issued Mar. 29, 2011, which is a continuation of U.S. patent application Ser. No. 10/180,763, filed Jun. 25, 2002, now U.S. Pat. No. 7,110,525 issued Sep. 19, 2006, which is a non-provisional application of 60/300,684, filed Jun. 25, 2001, each of which is expressly incorporated herein by reference.

TECHNICAL FIELD

The present invention relates generally to organized telecommunications systems and more particularly to a system and method for distributing communications among multiple possible destinations based on sensitivity to agent training status.

BACKGROUND OF THE INVENTION

The Call Center

A "call center" is an organization of people, telecommunications equipment and management software, with a mission of efficiently handling electronic customer contact. A typical call center must balance competing goals. Customers should experience high quality and consistent service as measured, for example, by how long the customer's call must wait in queue before being answered and receiving satisfactory service. At the same time, this service should be provided to make efficient use of call center resources.

Strategies for Call Center Management

"Workforce management" systems provide important tools for meeting the goals of the call center. These systems generate forecasts of call volumes and call handling times based on historical data, to predict how much staff will be needed at different times of the day and week. The systems then create schedules that match the staffing to anticipated needs.

Typically, an Automatic Call Distribution (ACD) function is provided in conjunction with a computerized Private Branch Exchange (PBX). This ACD function enables a group of agents, termed ACD agents, to handle a high volume of inbound calls and simultaneously allows a queued caller to listen to recordings when waiting for an available ACD agent. The ACD function typically informs inbound callers of their status while they wait and the ACD function routes callers to an appropriate ACD agent on a first-come-first-served basis.

Today, all full-featured PBXs provide the ACD function and there are even vendors who provide switches specifically designed to support the ACD function. The ACD function has been expanded to provide statistical reporting tools, in addition to the call queuing and call routing functions mentioned above, which statistical reporting tools are used to manage the call center. For example, ACD historical reports enable a manager to identify times: (a) when inbound callers abandon calls after long waits in a queue because, for example, the call center is staffed by too few ACD agents and (b) when many ACD agents are idle. In addition, ACD forecasting reports, based on the historical reports, allow the manager to determine appropriate staffing levels for specific weeks and months in the future.

Queue Management

ACD systems experience high traffic periods and low traffic periods. Consequently, ACD systems must be capable of automating two major decisions. The first major decision may be referred to as the "agent selection decision," i.e., when more than one agent is available to handle the next transaction, which agent should be chosen? The second major decision may be referred to as the "transaction selection decision," i.e., when more than one transaction is waiting for the next available agent and an agent becomes available, which transaction should the agent handle?

One approach to the agent selection decision is to set up a sequencing scheme, so that the switch of the ACD system follows the same sequence of agents until the first available agent in the sequence is found. The concern with this approach is that it creates "hot seats," i.e. an inequitable distribution of inbound calls to ACD agents who are high in the sequence. Most current ACD systems solve the agent selection decision by using a longest-idle-eligible-agent approach to provide a more equitable distribution of transactions.

There are also different approaches to the transaction selection decision in which there are more available transactions than there are ACD agents. One approach is to create one or more first-in, first-out (FIFO) queues. Under this approach, each transaction may be marked with a priority level by the switch of the ACD system. When an agent becomes available, the transaction with the highest priority is routed to the agent. If several calls of equal priority are waiting in a queue, the call which has been waiting the longest is routed to the available agent. If the call center conducts outbound transactions, each transaction is similarly submitted to a FIFO queue with a priority designation, with the switch routing transactions from the queue to the agents.

Queue/Team Management

Calls that arrive at a call center generally are classified into "call types" based on the dialed number and possibly other information such as calling number or caller responses to prompts from the network. The call center is typically served by an automatic call distributor (ACD), which identifies the call type of each incoming call and either delivers or queues it. Each call type may have a separate first-in-first-out queue in the ACD. In most existing call centers, the agents answering calls are organized into one or more "teams," with each team having primary responsibility of the calls in one or more queues. This paradigm is sometimes referred to as "queue/team."

In the queue/team model, scheduling for each team can be done independently. Suppose, for example, that the call center handles calls for sales, service, and billing, and that each of these call types is served by a separate team. The schedule for sales agents will depend on the forecast for sales call volume and on various constraints and preferences applicable to the agents being scheduled, but this schedule is not affected by the call volume forecast for service or billing. Further, within the sales team, agents are typically considered interchangeable from a call handling viewpoint. Thus, within a team, schedule start times, break times and the like, may be traded freely among agents in the team to satisfy agent preferences without affecting scheduled call coverage. See, U.S. Pat. No. 5,325,292, expressly incorporated herein by reference.

In a queue/team environment, when a new call arrived, the ACD determines the call type and places it in the queue, if all agents are busy, or allocates this call to the team member who had been available the longest.

Skill-Based Routing

The longest-idle-agent approach and the FIFO approach function well in applications having little variation in the types of transactions being handled by the ACD agents. If all agents can handle any transaction, these approaches provide a sufficiently high level of transactional throughput, i.e., the number of transactions handled by the call center in a particular time interval. However, in many call center environments, the agents are not equally adept at performing all types of transactions. For example, some transactions of a particular call center may require knowledge of a language other than the native language of the country in which the call center is located. As another example, some transactions may require the expertise of "specialists" having training in the specific field to which the transaction relates, since training all agents to be knowledgeable in all areas would be cost-prohibitive. For ACD applications in which agents are not equally adept at performing all transactions, there are a number of problems which at least potentially reduce transactional throughput of the call center. Three such problems may be referred to as the "under-skilled agent" problem, the "over-skilled agent" problem, and the "static grouping" problem.

The under-skilled agent problem reduces transactional throughput when the switch routes transactions to ACD agents who do not have sufficient skills to handle the transactions. For example, a call may be routed to an English-only speaking person, even though the caller only speaks Spanish. In another example, the transaction may relate to product support of a particular item for which the agent is not trained. When this occurs, the agent will typically apologize to the customer and transfer the call to another agent who is capable of helping the customer. Consequently, neither the agent's nor the customer's time is efficiently utilized.

Inefficient utilization is also a concern related to the over-skilled agent problem. A call center may have fixed groupings of agents, with each group having highly trained individuals and less-experienced individuals. Call-management may also designate certain agents as "specialists," since it would be cost prohibitive to train all agents to be experts in all transactions. Ideally, the highly skilled agents handle only those transactions that require a greater-than-average skill level. However, if a significant time passes without transactions that require highly skilled agents, the agents may be assigned to calls for which they are over-qualified. This places the system in a position in which there is no qualified agent for an incoming call requiring a particular expertise because the agents having the expertise are handling calls that do not require such expertise. Again, the transactional throughput of the call center is reduced.

Current ACD systems allow agents to be grouped according to training. For example, a product support call center may be divided into four fixed, i.e., "static," groups, with each group being trained in a different category of products sold by the company. There are a number of potentially negative effects of static grouping. Firstly, the call center management must devise some configuration of agents into groups. This may be a costly process requiring extensive analysis and data entry. Secondly, the configuration that is devised is not likely to be optimal in all situations. The pace and mix of transactions will change during a typical day. At different times, the adverse effects of the under-skilled agent problem and the adverse effects of the over-skilled agent problem will vary with respect to the transactional throughput of the call center. Thirdly, when a new product is released, the devised configuration likely will be less valuable. In response to changes in the size, pace and mix of the transaction load over the course of time, call management must monitor and adjust the performance of the current grouping configuration on an ongoing basis. When trends are detected, the grouping configuration should be changed. This requires the time and attention of call center managers and supervisors. Again, the transactional throughput is reduced.

It is thus known in the prior art to provide ACD systems that depart from the queue/team model described above. Calls are still categorized into call types. In place of queues for the call types, however, queues associated with "skills" are provided. The ACD's call distribution logic for the call type determines which queue or queues a call will occupy at various times before it is answered. Agents are not organized into teams with exclusive responsibility for specific queues. Instead, each agent has one or more identified "skills" corresponding to the skills-based queues. Thus, both a given call and a given agent may be connected to multiple queues at the same time. Agent skills designations may be further qualified, for example, as "primary" or "secondary" skills, or with some other designation of skill priority or degree of skill attainment. The ACD call distribution logic may take the skill priority levels into account in its call distribution logic.

In a skills-based routing environment, the "matching" of calls to agents by the ACD becomes more sophisticated and thus complicated. Agents who have more than one skill no longer "belong" to a well-defined team that handles a restricted set of calls. Instead, the skills definitions form "implicit" teams that overlap in complex ways. If, for example, a call center has 10 skills defined, then agents could in principle have any of 1024 possible combinations ($2^{10}$) of those skills. Each skill combination could be eligible to handle a different subset of the incoming calls, and the eligible subset might vary with time of day, number of calls in queue, or other factors used by the ACD in its call routing decisions.

Today, call center managers want to connect a caller to an ACD agent having exactly the right skills to serve the caller. However, "skills based" ACD agent groups are often small and, as a result, whenever an inbound call arrives, all such "skills based" ACD agents may be busy. In such instances, the ACD function can take call back instructions from the caller and the ACD function can manage the call back functions, for example, by assigning such calls, in accordance with the caller instructions, to a "skills based" ACD agent whenever one becomes available.

Scheduling of agents in a skills-based environment is thus a much more difficult problem than it is in a queue/team environment. In a skills-based environment, call types cannot be considered in isolation. Thus, for example, a heavy volume of Service calls might place higher demands on multi-skilled agents, causing an unforeseen shortage of coverage for Billing calls. Further, agents with different skills cannot be considered interchangeable for call handling. Thus, trading lunch times between a Sales-only agent and a multi-skill agent might lead to over-staffing Sales at noon while under-staffing Service at 1:00 p.m. This would lead to undesirable results. Moreover, with respect to the needs of a particular call type, a multi-skilled agent might provide no help over a given span of time, might be 100% available for calls of that type, or might be available part of the time and handling other call types for another part of time.

All agents having a particular combination of skills may be deemed a "skill group." A central problem of skills-based scheduling is then finding a way to predict what fraction of scheduled agents from each skill group will be available to each call type during each time interval being scheduled. If these fractions are known, then the effect of different agent schedules can be generated. Unfortunately, it is difficult or impossible to calculate the skill group availability fractions directly. These functions depend on the relative and absolute call volumes in each call type, on the particulars of the skills-based call distribution algorithms in the ACD, and on the skills profiles of the total scheduled agent population. Particularly as ACD skills-based routing algorithms themselves evolve and become more sophisticated, the factors affecting skill group availability become too complex for direct analysis. One proposed solution provides a feedback mechanism involving call handling simulation and incremental scheduling, to schedule agents in a skills-based routing environment. See, U.S. Pat. No. 6,044,355, expressly incorporated herein in its entirety.

In accordance with this "skills-based scheduling" method, a computer implemented tool is used to determine an optimum schedule for a plurality of scheduled agents in a telephone call center, each of the plurality of scheduled agents having a combination of defined skills. The plurality of scheduled agents are organized into "skill groups" with each group including all scheduled agents having a particular combination of skills. The method begins by generating a plurality of net staffing arrays, each net staff array associated with a given call type and defining, for each time interval to be scheduled, an estimate of a difference between a given staffing level and a staffing level needed to meet a current call handling requirement. In addition to the net staffing arrays, the method uses a plurality of skills group availability arrays, each skills group availability array associated with the given call type and defining, for each combination of skill group and time interval to be scheduled, an estimate of a percentage of scheduled agents from each skill group that are available to handle a call. According to the method, the plurality of arrays are used to generate a proposed schedule for each of the plurality of scheduled agents. Thereafter, a call handling simulation is then run against the proposed schedule using a plurality of ACD call distribution algorithms (one for each call type being scheduled). Based on the results of the call handling simulation, the net staffing arrays and the skills availability arrays are refined to more accurately define the net staffing and skills usage requirements. The process of generating a schedule and then testing that schedule through the simulator is then repeated until a given event occurs. The given event may be a determination that the schedule meets some given acceptance criteria, a passage of a predetermined period of time, a predetermined number of iterations of the process, or some combination thereof. A proposed schedule is "optimized" when it provides an acceptable call handling performance level and an acceptable staffing level in the simulation. Once the proposed schedule is "optimized," it may be further adjusted (within a particular skill group) to accommodate agent preferences.

U.S. Pat. No. 5,206,903 to Kohler et al. describes ACD equipment which uses static grouping. Each static group of agents is referred to as a "split," and each split is associated with a different queue. The agents are assigned to splits according to skills. Within a single split, the agents may be limited to knowledge of different subtypes of transactions. Preferably, there is at least one agent in each split who is trained to handle calls of any of the subtypes within the particular split. This "expert" may also be trained to efficiently handle calls of other types, i.e., other splits. Each agent possesses up to four skill numbers that represent various abilities of the agent with respect to handling transactions related to subtypes and types of transactions. The ACD equipment assigns each incoming call three prioritized skill numbers that estimate skill requirements of the incoming call. The skill numbers of the incoming call are considered "prioritized," since they are viewed sequentially in searching for a match of the call with an agent, so that the second skill number of the call is unnecessary if a match is found using the first prioritized skill number. The incoming call is assigned the one, two or three prioritized skill numbers and is placed in the appropriate queue of the appropriate static group of agents. A search is made among the available agents for an agent-skill number that matches the first skill number of the call. If no match is found after a predetermined time delay, the second prioritized skill number of the call is used to find a match. If no match is found after a second predetermined time delay, the third prioritized skill number is considered. Then, if no match is still found, the ACD equipment of Kohler et al. expands the search of available agents to other groups of agents.

While the Kohler et al. patent does not directly address the problems associated with static groups, it does consider the skills of the individual agents. The prioritized skill numbers assigned to the incoming calls are logically ordered. The patent refers to the first skill number of a call as the primary call-skill indicator. This primary indicator is used to define the minimal skill level that is required for an agent to competently handle the call. Consequently, if a match is made with the primary indicator, the ACD agent may not be over-skilled or under-skilled. However, if the search is unsuccessful, the secondary call-skill indicator is utilized. The search for a match to the secondary indicator may cause the call to be routed to an agent having more than the minimal required skill. The third prioritized skill number that is assigned to the incoming call is referred to as the "tertiary" call-skill indicator. The tertiary indicator is yet another skill level beyond what is minimally required to competently handle a call. Since the tertiary indicator is utilized only if a match is not found for either of the primary or secondary indicators, an overly skilled agent of the appropriate group will handle the call only if that agent is the only available capable agent. Thus, more highly skilled agents are assigned only when their skills are required, or no lesser-skilled agent is available to handle the call.

Group Routing

Various types of conventional automatic distributors (ACDs) are available to distribute incoming calls to a group. Reservation and information services may be provided by large companies, such as major airlines, and may consist of geographically separated groups of agents that answer incoming calls distributed to the agents by separate ACDs. Agent communication terminals (ACTs) which are connected to an ACD are utilized by the agents to process incoming calls routed to a particular ACT by the ACD.

A PBX type ACD such as a Definity® ACD available from AT&T functions as a conventional PBX and further functions as an ACD to distribute incoming calls to local agents connected to the PBX. Another type of ACD consists of the utilization of an electronic telecommunication switch such as a 5ESS® switch available from AT&T which is capable of providing ACD service when supposed by ACTs coupled to the switch. Both types of ACD typically function as independent systems which handle incoming calls and make internal decisions concerning which agent will receive a given call. Both types of ACD systems are capable of generating statistical reports which can be monitored by a workstation coupled to the ACD system to allow a supervisor to monitor call handling statistics. Such data typically represents an average of statistics for a given system.

U.S. Pat. No. 4,737,983 to Frauenthal et al. addresses a method of balancing traffic loads to a plurality of customer ACDs. Each ACD periodically transmits call congestion data representing an accumulation of data for the ACD to a central database. Based on this data, the database determines a preferred ACD to which to route an incoming call. Although this technique may be generally sufficient for balancing certain traffic loads, it relies on accumulated or aggregate data on which to base decisions and, hence does not permit specific agents, i.e. ACTs, to be identified to receive a call.

In U.S. Pat. No. 4,953,204 to Cuschleg, Jr. et al., a method is described for queuing calls to a multi-location service provider having a plurality of ACDs. Decisions on routing a call to the ACD is based on the availability of a non-busy voice channel to the ACD. If all channels (circuits) are busy, a call is queued until an ACD becomes available to take the call as determined by a non-busy circuit to the respective ACD. However, the number of agents associated with a given ACD does not necessarily equal the number of circuits provided to the ACD. Thus, the monitoring of available circuits as the basis for queue management and the routing of calls does not correspond to actual agent availability.

Telephone call centers that handle calls to toll-free "800" numbers are well-known in the art. Typically, a company may have many call centers, all answering calls made to the same set of 800 numbers. Each of the company's call centers usually has an ACD or similar equipment capable of queuing calls. ACD management information systems keep statistics on agent and call status, and can report these statistics on frequent intervals. Such capabilities are in use today for centralized reporting and display of multi-location call center status.

In such systems, the company will want to distribute the calls to its call centers in a way that will optimally meet its business goals. Those goals might include low cost of call handling, answering most calls within a given amount of time, providing customized handling for certain calls, and many others. It is also known in the prior art that certain call routing criteria and techniques support a broad range of business goals. These include "load balancing," "caller segmentation" and "geographic routing." Load balancing refers to distribution of calls so that the expected answer delay for new calls is similar across all the call centers. If other considerations do not dictate otherwise, load balancing is desirable because it provides optimum efficiency in the use of agents and facilities, and it provides the most consistent grade of service to callers. In special situations it might be desirable to unbalance the load in a particular way, but control over the distribution of call load is still desired.

If the caller's identity can be inferred from the calling number, caller-entered digits, or other information, that identity may influence the choice of destination for the call. Call routing based on such information is referred to as caller segmentation. Also, it has been found desirable for particular call centers to handle calls from particular geographic areas. The motivation may be to minimize call transport costs, to support pre-defined call center "territories", or to take advantage of agents specifically trained to handle calls from given locations. Such techniques are known as geographic routing.

The interexchange carriers who provide 800 service today generally support some form of "routing plan" to help achieve load balancing, caller segmentation and geographic routing. Typically these routing plans allow 800 call routing based on time of day, day of week, the caller's area code, caller-entered digits, and fixed percentage allocations. Predominately, however, the routing plans supported by the carriers are static in the sense that they do not automatically react to unexpected variations in incoming call volume or distribution, nor to actual call delays being experienced at each destination. Reaction to changing conditions is done via manual modification of the plan, on a time scale of minutes or hours.

Recent service offerings from some interexchange carriers offer some degree of automatic reaction to changing conditions. One such offering, called "alternate termination sequence" or "ATS" (from AT&T), allows customers to establish maximum numbers of calls to be queued for each destination, with a pre-defined alternative when a primary destination is overloaded. Another offering, referred to as "intelligent routing control" or "IRC" (from MCI), allows an ACD to refuse a call from the network, again resulting in pre-defined alternative call handling. A third kind of service, AT&T's Intelligent Call Processing, lets the interexchange network pass call-by-call data to a computer.

In a conventional ACD, phone calls are processed on a first-in, first-out basis: the longest call waiting is answered by the next available agent. Answering calls across multiple automated call distributors (ACD) is typically done on a first-in, first-out basis dependent upon time of receipt of the call by each ACD, whether the call is directly connected or forwarded.

U.S. Pat. No. 4,893,301 is an example of use of a multiple line interface modules with remote line interface connectivity to a PCM bus. Specifically, it discloses use of a portion of an ACD at a remote location from a call center which are connected together via a T-1 connection to perform centralized call processing. This is an example of a single ACD with remote input and processing rather than a network of multiple ACDs forming a virtual call center. In the invention described in this patent, it is possible to process calls at the single ACD on a first-in first-out basis.

U.S. Pat. No. 4,048,452 discloses an ACD where the time in queue for each call is measured and compared against upper and lower time thresholds. When time in queue exceeds an upper threshold, the call is re-directed, provided that the measured time in alternative queue for the oldest call is less than the threshold.

U.S. Pat. No. 4,737,983 discloses an ACD with a database with a pointer maintained to the next entry in a table to be initially selected in response to a next call routing query. Tests may be performed to determine if call should actually be routed to the selected ACD.

U.S. Pat. No. 4,757,529 discloses an ACD creating a separate queue for each call type, detecting when a terminal becomes available, and distributing waiting calls from different queues to servers in accordance with defined priority values.

U.S. Pat. No. 5,073,890 discloses an automatic call distributor for providing ACD service from remote ACD agents.

U.S. Pat. No. 5,278,898 discloses a system for managing a hold queue.

U.S. Pat. No. 5,309,513 discloses a telephone system comprising a plurality of automatic call distributors for receiving and distributing calls in a sequential order.

U.S. Pat. No. 5,369,695 discloses a facility for redirecting a call from one destination point to another, in which event a new timer value could be same as or different from prior timer value.

Another call distribution scheme is provided in Gechter et al., U.S. Pat. No. 5,036,535. This patent discloses a system for automatically distributing telephone calls placed over a network to one of a plurality of agent stations connected to the network via service interfaces, and providing status messages to the network. Gechter et al.'s disclosed system includes means for receiving the agent status messages and call arrival messages from the network, which means are connected via a network service interface to the network. Routing means responsive to the receiving means is provided for generating a routing signal provided to the network to connect the incoming call to an agent station through the network. In the system disclosed in Gechter et al, when an incoming call is made to the call router, it decides which agent station should receive the call, establishes a call with that agent station, and then transfers the original call onto the second call to connect the incoming caller directly to the agent station and then drops out of the connection. (See, Gechter et al., column 11, lines 45-51).

U.S. Pat. No. 5,193,110 issued to Jones et al discloses an integrated services platform for a telephone communications system which platform includes a plurality of application processing ports for providing different types of information services to callers. In Jones et al's disclosed system, a master control unit and a high speed digital switch are used to control processing of incoming phone calls by recognizing the type of service requested by the caller and then routing the call to the appropriate processing port. The Jones et al system is disclosed as an adjunct to current switching technology in public and private networks.

Intelligent Call Management

Call centers are also used to make outbound calls, for example for telemarketing. Agents making outbound calls, referred to as outbound agents, are typically separate from ACD agents handling inbound calls and call center software separately manages outbound call lists for outbound agents to ensure that each outbound agent wastes little time in dialing or in performing overhead operations.

A call center typically has multiple agents for answering incoming calls and placing outgoing calls. A call center may also have agents participating in outgoing call campaigns, typically in conjunction with an outbound call management system. Each agent may be assigned to a particular group, such as an inbound group or an outbound group. Agents can also be assigned to a supervisor team, which represents multiple agents that report to the same supervisor.

In certain situations, it is necessary to restrict an agent's activity to answering calls or handling a particular type of call (e.g., answering only incoming calls). For example, during an outbound campaign, the system placing the outbound calls and controlling the rate at which the calls are placed, e.g., a so-called predictive dialer, relies on the availability of the agent to handle an answered call. If the system places outbound calls expecting the agent to be available, but the agent instead places their own call to another agent or a supervisor, or has an incoming call connected to them, the outbound system may not have an agent available to handle an answered outbound call. Additionally, if an agent is assigned to handle incoming calls, but instead places a call to another agent or listens to voice mail messages, the number of queued incoming calls may increase, thereby increasing the waiting time experienced by the callers.

In existing call centers, agents can be manually switched from one group to another (e.g., from an inbound group to an outbound group). This switching may be performed by a supervisor using a terminal or other device coupled to the call center. In other systems, a supervisor may instruct particular agents to switch from inbound call processing to outbound call processing, or vice versa.

One document which provides considerable information on intelligent networks is "ITU-Recommendation Q.1219, Intelligent Network User's Guide for Capability Set 1", dated April, 1994. This document is incorporated herein by reference.

One known system proposes a call-management method and system for distributing calls to a plurality of individuals, such as automatic call distribution (ACD) agents, which routes calls to the individuals based upon a correlation of attributes of the individuals with calls that are tagged with identification of abilities that are advantageous to efficiently processing the calls. That is, for each call that is to be distributed, one or more skills that are relevant to efficient handling of the call are determined and then used to route the call to an appropriate individual. In addition, call management preferences may also be accommodated.

It is therefore apparent that the prior art has given a good deal of attention to the optimization of call center operations, including inbound automatic call directors, outbound predictive dialers, combined operations, agent scheduling, and call routing.

In general, the known optimization methods seek to minimize the immediate cost function for call center operation. Thus, factors relevant to a present cost of operations ("cost" being given a broad interpretation) are analyzed and an algorithm applied for minimization.

SUMMARY AND OBJECTS OF THE INVENTION

The present invention seeks to apply new methods of optimization for call routing. Thus, the present invention seeks to optimize long term call center operations, rather than immediate efficiency per se. Thus, at various times, the system performs functions which are different or even opposite the result expected to achieve highest short term efficiency. Preferably, however, during peak demand periods, the system assures high short term efficiency by switching or adapting mode of operation.

Therefore, according to the present invention, a number of additional factors are applicable, or the same factors analyzed in different ways, beyond those employed in existing optimizations. Since most call centers are operational for extended periods of time, by analyzing and optimizing significant cost factors beyond those contemplated by the prior art, a more global optimization may be achieved.

One critical long term cost factor in call center operations is agent training. While this is directly apparent for "help desks", where the agents must be skilled in technical issues, it is also true in sales and service. Sales agents must be trained to close sales efficiently, with high customer satisfaction. This requires that the agent understand the customer's actual needs, price sensitivity, discretionary needs, and the available product or service to be sold. Training can assist agents in taking an order quickly, while avoiding incomplete transactions and non-purchase directed inquiries on a sales call.

In a service environment, the goal is to satisfy the customer at lowest cost to the company. Often, this comes through making a reasonable offer of compromise quickly, which requires understanding the issues raised by the customer. Delay leads to two costs; the agent's time, and the possibility of increased demands by the customer.

In technical support operations, the agent must understand the technical issues of the product or service. The agent must also understand the psychology of the user, who may be frustrated, angry, apologetic, or even lonely. The agent must often remotely diagnose the problem, or understand the information provided by the caller, and communicate a solution or resolution.

In each case, the caller characteristics and issues will often have a significant effect on the duration of the call. While, in general, more skilled agents will have a higher productivity, in some cases, the caller restricts throughput. Therefore, even though the agent is capable of completing the call quickly, the caller may cause inordinate delays. According to the present invention, through a number of methods, the caller characteristics are determined or predicted, and an appropriate agent selected based on the anticipated dynamic of the call. Thus, for example, if the anticipated call duration for a successful outcome, based on the caller characteristics is a minimum of 5 minutes (depending on the agent), then an agent who is likely to complete the call in about five minutes may be selected as the optimum; agents who would be able to complete the call within 4 minutes, while technically more productive, may have little impact on the actual call duration, and thus would be inefficiently employed. Likewise, an agent anticipated to complete the call in 6 minutes might be deemed inefficient, depending on the availability of other agents and additional criteria. The call may be selected as a training exercise. In this case, an agent is selected for whom training would be expected to operate with a certain degree of inefficiency to complete the call. In some cases, unsupervised training is instituted. In other cases, a training agent (or automated system) is allowed to shadow the call, providing assistance, instruction and/or monitoring of the trainee agent during the call. In this case, it would be anticipated that the call duration would be greater than 5 minutes, due to the training nature of the call. Further, the required trainer assistance further reduces immediate efficiency. However, as the agents in the pool become more skilled, long term efficiency increases.

More highly skilled agents are both worth more and generally command higher compensation. A program which trains agents internally is either required, due to lack of specific external training programs, or is cost effective, since new hires can be compensated at a lower rate than trained and experienced hires. Thus, for long-term operations, there is an incentive to train agents internally, rather than seeking to hire trained agents.

Agents may receive additional compensation for training activities, either for their training activities, performance based compensation based on the improvement of their trainees, or both. Thus, there is an incentive for agents to become skilled and to assist in the training. As a result, the average skill level and uniformity in a call center will increase. However, since the optimal skill palette within a call center typically is a moving target, the training process will never cease.

Often, live interaction is an important component of training. Therefore, a significant component of the training encompasses interaction with callers in real-world situations. Training often involves presenting agents with new challenges and experiences in order to assure breadth of exposure.

According to prior skill-based routing schemes, an agent skill level is considered a static upper limit on capabilities, and the ACD avoids distributing calls to agents below a threshold. Agents may be called upon to serve requests within their acknowledged skill set. On the other hand, according to the present invention, each call is considered a potential training exercise, in order to expand the capabilities of the agent. Therefore, to the extent that the nature of the call can be determined in advance, the incentive according to this scheme is to route the call to an agent who is barely capable of handling the call, and to avoid routing only to the best available agents. This strategy has other implications. Because agents are challenged continually, there is reduced incentive for an agent to limit his skills to avoid the "tougher" assignments. Further, a self-monitoring scheme may be implemented to determine the status of an agent's skill with each call. For example, agent performance is typically determined on a call-throughput basis, since call centers are managed on a man-hour requirement basis and agents compensated on a per-hour basis. Therefore, based on a presumed agent skill set and an estimation of the skills required for a given call, a call duration may be predicted. The actual duration is then compared with the predicted duration, providing a performance metric for the agent.

This scheme also allows determination of the pertinent factors for call duration, both based on the information about the call or caller and the skill set of the agent.

It is noted that, during peak demand periods, reduced productivity due to training is preferably minimized. Thus, as demand increases, high skill set agents are preferably reassigned from training to active status, while lower skill set agents are assigned to calls well within their capabilities. Thus, during such peak demand periods, the staffing requirement will be no worse than traditional call centers. On the other hand, since training is integrated with operations, over a period of time, the average skill of all agents will increase. Thus, more skilled agents will be available at peak periods, reducing overall staffing requirements over a long term.

It is noted that, while preferred embodiments of the invention involve the training of human agents, the invention is not so limited. The agents, which may be considered resources, may be automated devices which are capable or learning or training, e.g., so-called artificial agents, or even animals or other biological or hybrid systems. The state of the resource is preferably measured, predicted or modeled, to provide a skill set, skill profile, or aptitude rating. In some instances, e.g., where there is sufficient capacity in the system to permit short-term inefficiencies, a training mode or protocol is instituted, wherein the trainable resources are presented with training challenges. In this way, the resources are improved. On the other hand, when the available capacity is limited or deemed insufficient, a high-efficiency mode or protocol is adopted, to fill a short term demand on the system. Generally, a resource selected for efficient operation will differ from a resource for training operation, though this is not necessarily the case: an agent capable of training to perform a task generally has minimally sufficient skills for handling the task, albeit at lower efficiency than a trained resource. Likewise, even in the case of automated systems, it is sometimes undesirable to simply "clone" or copy a resource; rather, the internal logic and efficiency of such resources may differ; the trainer resource, for example, may have limited skills, be computationally inefficient, slow, require additional resources, or have high cost. (The trainer resource for an artificial agent may be, for example, a human.)

However, another reason for avoiding simply proliferating existing resources is that training errors in the trainer resources will propagate, without significant opportunity for remediation. Thus, for example, if the trainer resource is an artificial neural network, trained with real world example, erroneous data or artifacts will be propagated. On the other hand, training new resources without copying existing resources permits greater variety, and thus an ability to obtain new strategic paradigms. In some cases, resources (trainer or training) may be used in parallel, and a result selected by voting or selection of result through other known means. The parallel tasking will, of course, according to the present invention be reduced or eliminated when load handling requirements exceed available capabilities for such redundant (or partially redundant) activities.

In accordance with the present invention, an ACD function utilizes an Automatic Call Sharing (ACS) algorithm to enable inbound and outbound call functions to be performed by one ACD agent. Advantageously, in accordance with the present invention, ACD agent idle time is used to make outbound calls, while maintaining a desired level of service on inbound calls. As will be described in detail below, embodiments of the present invention accomplish the desired function by utilizing the ACS algorithm to determine when an ACD agent assignment to work on outbound calls will be given priority over the agent's waiting to work on inbound calls. Therefore, by combining inbound and outbound call handling, assuming that the skill sets for both tasks correspond, or that agents are capable of both, it is possible to staff a call center with sufficient headroom to allow non-emergent operational status most of the time.

Instead of maintaining skill disparities, the present invention seeks to minimize skill disparities between agents, making skill-based routing of calls within a center easier. Known call centers present issues due to small groups of agents having a requisite skill. On the other hand, as the proportion of agents with each skill increases, the ease of finding an agent with the right mix of skills is increased.

The present invention also provides a central database for skill set management, allowing a geographically dispersed call center or freelance agents to be called upon dynamically as required. Thus, if a peak demand period is much shorter than an agent shift, off-site freelance agents may be dynamically called upon, for example through the Internet, ISDN, POTS, DSL, Cable modem, or a VPN, to handle calls. In this case, the training of such off-site or freelance agents will generally differ from those who are in-house agents. For example, if freelance agents are called upon only during peak demand periods, these agents will be trained specifically for the skills in short supply during such periods.

In order to gage the skill set required of an agent for a call, a number of methods may be employed. Callers may use ACDs to instruct the system as to the nature of the call. Using a menu or hierarchal menu, a series of questions may be asked of callers in the queue to determine the identity of the caller and the nature of the call. Likewise, ANI/DNIS information, IP address or the like, or other communications channel identifier may be employed to identify the calling telephone communications channel. This, in turn, may be used to call a database record associated with the identity of the caller or communications channel.

In many instances, call centers are implemented to provide support for computer systems. It is known to provide a message automatically generated by a computer to identify the identity and status of the computer at a given time, and possibly the nature of a computer problem. The present invention allows this message to be associated with a direct semantic communication session with the user, for example to predefine the nature of the call and possibly the skill set required to address the issues presented. This information can also be used to trigger a call-back after the information is analyzed and an appropriate agent is available.

Often, a highly skilled agent will serve as mentor for the trainee, and "shadow" the call. Thus, the routing of a call may depend on availability of both trainee and skilled instructor.

Another aspect of call center efficiency impacted by this scheme is agent motivation. Because an agent with lower skill levels will be given assignments considered challenging, while more skilled agents given training assignments which may be considered desirable, there is an incentive for agents to progress, and likewise no incentive to avoid progressing. Thus, an agent will have no incentive to intentionally or subliminally perform poorly to avoid future difficult skill-based assignments.

In operation, the system works as follows. Prior to call setup, an estimation is made of the nature of the call and the prospective issues to be encountered. This is performed in standard manner, for example in an inbound call based on the number dialed, ANI/DNIS of the caller (with possible database past history lookup), selections made through automated menus, voice messages, or other triage techniques. In the case of outbound calls, a database of past history, demographic information (both particular to the callee and for the region of the call), and nature of the call may all be used to determine the projected agent skill set required for the call.

It is noted that, after initial call setup, the actual skill set required may become apparent, and the call may be rerouted to another agent.

Once the predicted skill sets are determined, these are then compared against a database of available agents and their respective skill sets. A weighting is applied based on perceived importance of selection criteria, and the requirements correlated with the available agent skill sets. When the call center is operating below peak capacity, marginally acceptable agents are selected to receive the call, possibly with a highly acceptable agent available if necessary or to monitor the call. When the call center is operating new peak capacity, the agents are assigned to minimize the anticipated man-hour burden (throughput) and/or wait time. Thus, peak throughput operation generally requires that agents operate within their proven skill sets, and that training be minimized. However, even during such peak periods, there may be significant training opportunities that should not be missed.

Each call is associated with a skill expression that identifies the skills that are relevant to efficient handling of the call. As previously noted, the preferred embodiment is one in which more than one relevant skill is identified, so that all of the factors that determine a "best" agent for handling a call can be considered. The relevant skills may be determined using different techniques. Automatic number identification (ANI) may be used to ascertain information regarding the calling party, while dialed number identification service (DNIS) may be used for information regarding the called party. Additional information may be gathered by means of interactive voice response (IVR) input and database lookups. For example, customer database retrieval allows call-management to determine a customer history and customer preferences.

The skill expression of a call includes the required skills and skill levels for efficiently handling the call. In one embodiment, the skills may be divided into two categories: mandatory and optional skills. Mandatory skills are those skills that an agent must possess in order to handle the call, even if the call remains in queue for an extended period of time, for example, language proficiency. Optional skills are those that are considered in the selection of the appropriate agent, but not critical.

It is noted that the peak/non-peak considerations may be applied on a call-by-call basis. Thus, certain callers may be privileged to have a shorter anticipated wait and greater efficiency service than others. Thus, these callers may be treated preferentially, without altering the essential aspects of the invention.

The present invention may also generate a set of reports directed to management of the call center. The quality of service reports are generated to indicate the effectiveness of the call-management method and system. An agent summary report is organized according to the activities of particular individuals, i.e. agents. A skill summary report organizes the data by skill expressions, rather than by agents. This report may list the number of calls requiring selected skill expressions and the average time spent on those calls. Other known report types are also possible. An important report type is the improvement in call center efficiency over time, i.e., decreased wait time, increased throughput, increased customer satisfaction, etc. Thus, each agent should demonstrate improved skills over time. Peak throughput should meet or exceed reasonable expectations based on a statically skill-routed call center. Other metrics may also be evaluated.

It is noted that the method according to the present invention provides a new optimization scheme method for automated call distribution. Therefore, the optimization scheme may generally be substituted for existing optimization schemes in such automated call distributors.

In addition, the present invention also suggests a new method of scheduling agents for work shifts. Rather than populating a set of required skill levels to fulfill anticipated needs, the work shift schedule includes complementary scheduling of trainers and trainees, both on a work shift level and shift rotation level.

It is therefore an object of the invention to provide a method of selecting a call handling agent handle a call, comprising the steps of identifying at least one characteristic of a call to be handled; determining whether the call center load is high; if the call center load is not high, selecting a first call handling agent having at least marginally sufficient skills to handle the call having the at least one characteristic, the call handling agent having a skill set determined to be deficient with respect to the characteristic, while also selecting a second call handling agent capable of training other agents with respect to the at least one characteristic to train the first call handling agent; and if the call center load is high, selecting a third call handling agent having at least marginally sufficient skills to handle the call having the at least one characteristic, the call handling agent having a skill set determined to be sufficient with respect to the characteristic.

It is also an object of the invention to provide a method of selecting an agent to handle a call, comprising the steps of, in response to availability of a call having a set of identified characteristics, selecting one of a plurality of agents who has a worst sufficient characteristic score for the individual call type to handle the call, including identifying a set of characteristics of the call, retrieving an agent profile, comprising a set of metrics corresponding to the set of identified characteristics, and selecting one of the available call handlers who has an agent profile which indicates that the agent is likely capable of handling the call, but requires training with respect to calls having the set of identified characteristics.

It is a further object of the invention to provide a method for determining an efficient schedule for a plurality of agents in a call center, balancing call center efficiency and agent training opportunity, each of the plurality of agents having a skill profile, comprising the steps of predicting an aggregate set of characteristics for received calls during a contiguous period of time; selecting a set of agents having a bimodal distribution of skills, a first mode representing agents having a skill set deficient with respect to the set of characteristics and a second mode representing agents having a skill set permitting them to train the agents represented by the first mode with respect to the characteristics; and scheduling the selected set of agents for the contiguous period of time and pairing agents corresponding to the first mode with agents corresponding to the second mode for a call of the set of characteristics.

Another object of the invention provides a method for determining an efficient schedule for a plurality of agents in a call center, balancing call center efficiency and agent training opportunity, each of the plurality of agents having a skill profile, comprising the steps of predicting an aggregate set of characteristics for received calls during a shift schedule; selecting a set of agents having a bimodal distribution of skills, a first mode representing agents having a skill set deficient with respect to the set of characteristics and a second mode representing agents having a skill set permitting them to train the agents represented by the first mode with respect to the characteristics; and scheduling the selected set of agents for the shift schedule and pairing agents corresponding to the first mode with agents corresponding to the second mode for a call of the set of characteristics.

A further object of the invention provides a method optimizing an association of a communication with an agent in a communications center, comprising the steps of determining a characteristic of a communication; retrieving a skill profile of a set of agents; and matching the communication with an agent based on the respective skill profile, the cost utility of the match being optimized with respect to long term operation of the communication center, including training costs and anticipated future improvements in agent skills based on training opportunities.

An object of the invention also includes providing a method for matching a communication with a communication handler, comprising the steps of predicting a set of issues to be handled during the communication; retrieving a profile record for each of a plurality of communications handlers; analyzing the profile records with respect to the anticipated issues of the communication to determine a minimal capability, training requirement, and a training capability with respect to the anticipated issues; selecting a first communication handler having a minimal capability to handle the anticipated issues, a training requirement with respect to the anticipated issues; and selecting a second communication handler having a training capability with respect to the anticipated issues to train the first communication handler.

A further object of the invention provides a method of improving a skill set of an agent, comprising the steps of determining a skill profile of each of a set of agents agent; determining a set of characteristics of a communication, the characteristics and the skill profile having correlated features; determining an anticipated surplus of agents for communication volume; selecting an available agent having a skill profile anticipated to be sufficient to handle the communication, said skill profile being indicative of a lower level of skill with respect to at least one of the set of characteristics than another available agent; and establishing channel for the communication with the selected available agent and employing the communication as a training exercise. Advantageously, the selected agent may not be penalized based on performance during the training exercise. The skill profile may be updated after the training exercise to represent a higher level of skill with respect to the characteristics of the communication, and/or based on a utility of a communication. The selecting may be based on an optimization of the utility and cost of the communication, the agent training resulting from the training exercise being a component of the utility. The communication routing may also be optimized based on a cost-utility function, said cost-utility function comprising a valuation of immediate costs and utilities and a valuation of persistent agent training costs and utilities.

It is also an object of the invention to provide a method of allocating a resource to handle a task, comprising the steps of: determining a task-handling load; identifying a characteristic of a task to be handled; in dependence on said determined task-handling load, selecting a handling protocol selected from the group consisting of: selecting a first trainable resource predicted to have deficient skills relating to the task based on the identified characteristic, while also selecting a second resource capable of assisting in training the first trainable resource with respect to the characteristic; and selecting a third resource predicted to have sufficient skills relating to the task based on the identified characteristic, wherein according to a selected protocol, a trainable resource is trained with respect to the at least one characteristic, or a sufficiently skilled resource handles the task. Preferably, the third resource has skills which are optimum for handling the task. Typically, a plurality of tasks are simultaneously handled, and a selected third resource has optimum skills with respect to the available resources and the identified characteristics of the tasks to be handled. Preferably, the system is provided for training humans, i.e., the trainable resource comprises a human. For example, the environment may be a communications or call center, where human communications handling agents are trained to have skills predicted to be required by incoming or outgoing communications requirements. The selecting step comprises, for example, retrieving a resource profile, comprising a set of metrics corresponding to the set of identified characteristics. The protocol selection may be based on a threshold task-handling load for a group of resources. The skill or imputer skill of a resource may be updated after selection thereof and/or successful completion of an assigned task, and/or based on a performance during task handling.

According to another object of the invention, each resource has skills which are classified as a multidimensional vector, and wherein the identified task to be handled has a characteristic represented as a predicted multidimensional vector of required skills of a handling resource, wherein a selected first resource and second resource together have a composite multidimensional skill vector which substantially corresponds to the predicted multidimensional vector of required skills.

According to a further object of the invention, the second resource has a training skill for remediating a skill deficiency with respect to the identified characteristic, such that after handling the task, the first resource skills are improved.

Another object of the invention provides a plurality of available trainable first resources, wherein a particular first resource is selected based on which particular trainable first resource is predicted to have a maximum value gain in skills as a result of selection. Likewise, a plurality of second resources may be available, wherein a particular second resource is selected based on which particular second resource is predicted to be able to impart a maximum value gain in skills as a result of selection. Further, a plurality of first and second resources may be available, wherein a particular set of first and second resources are selected based on which set of first and second resources is predicted to have an optimum gain in skills for the first resource and lowest overall cost, as a result of selection of the set.

According to another object of the invention, a group of resources having sufficient skills for handling the task are aggregated, with a first resource having a worst skill set for handling the task selected from the group.

A further object of the invention optimized long-term cost utility. For example, resources are selected based on an optimum long-term cost utility of such selection, including training costs and anticipated future improvements in resource skills based on training opportunities.

Another object of the invention provides a method wherein the identification step comprises anticipating issues to be raised in handling the task, the selecting step comprising analyzing profile records of resources with respect to the anticipated issues to determine a minimum capability requirement, training requirement of a first resource, and a training capability of a second resource with respect to the anticipated issues, selecting a first resource having a skill exceeding the minimum capability requirement to handle the anticipated issues and having a training requirement with respect to the anticipated issues, and selecting a second resource having a training capability with respect to the anticipated issues, whereby a selected first and second resource have sufficient skills to handle the anticipated task, while the second resource assists the first resource in improving task handling capabilities.

It is a further object of the invention to provide a method for determining an efficient schedule for a plurality of agents in a call center, balancing call center efficiency and agent training opportunity, each of the plurality of agents having a skill profile, comprising the steps of predicting an aggregate set of characteristics for received calls during a contiguous period of time; selecting a set of agents having a target aggregate distribution of skills, including training agents having a skill set deficient with respect to the set of characteristics and trainer agents having a skill set permitting them to train the training agents with respect to the characteristics; scheduling the training agents and trainer agents for the contiguous period of time; and pairing training and trainer agents corresponding for a call.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

Similar reference characters refer to similar parts or steps throughout the several views of the drawings.

DETAILED DESCRIPTION OF THE PREFERRED EMBODIMENTS

The following detailed description sets forth numerous specific details to provide a thorough understanding of the invention. However, those of ordinary skill in the art will appreciate that the invention may be practiced without these specific details. In other instances, well-known methods, procedures, protocols, components, and circuits have not been described in detail so as not to obscure the invention.

Figure 1:
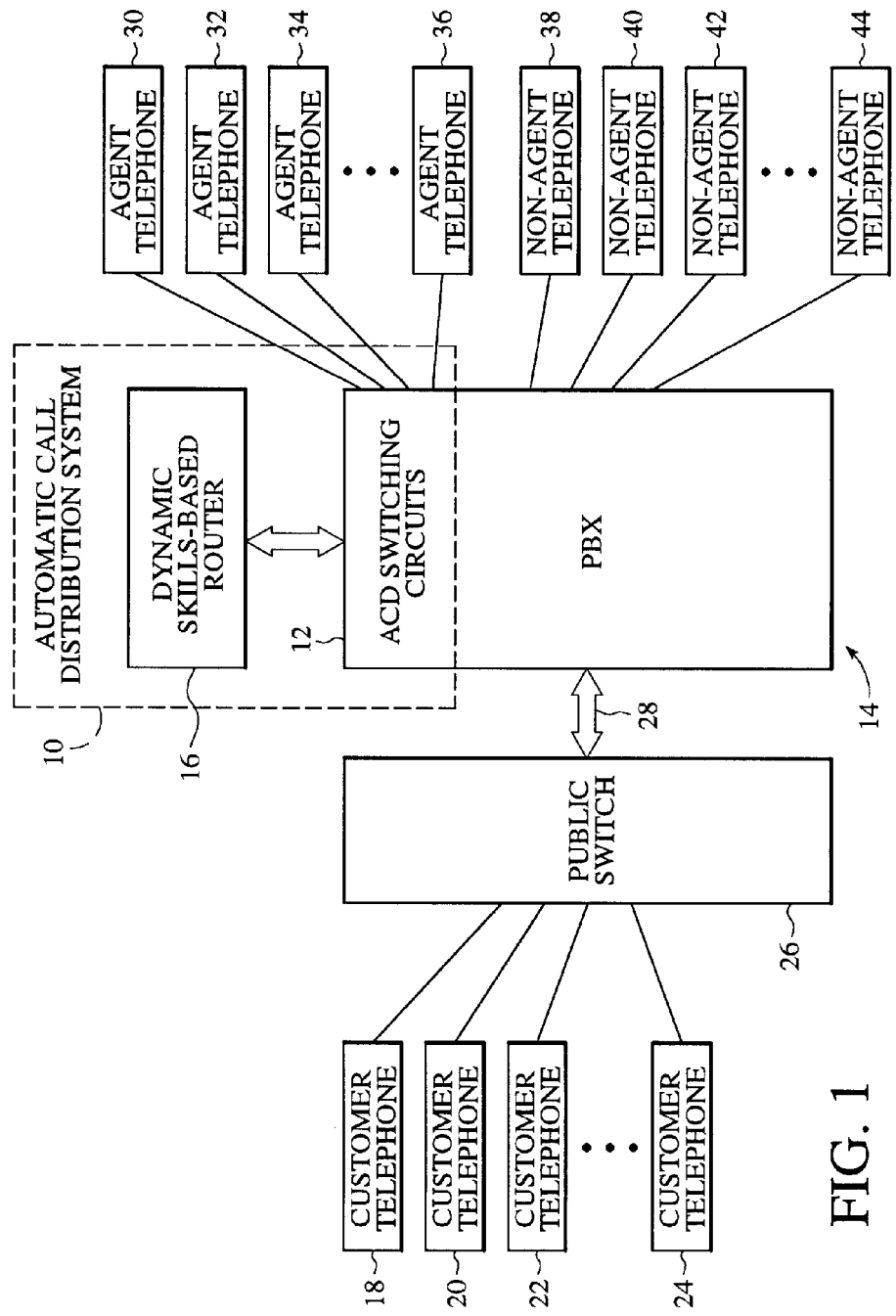
FIG. 1 is a block diagram of a telecommunications network having a switch connected between a call routing processor and multiple call centers that receive calls routed according to the teachings of the present invention.

The present invention describes an improved method for distributing telephone calls or With reference to FIG. 1, an ACD system 10 includes switching circuitry 12 of a PBX 14 and an adjunct router 16. The telecommunication system of FIG. 1 permits inbound telephone calls (transactions) from customers to agents of a call center, as well as outbound telephone calls from the agents to customers. A number of customer telephones 18, 20, 22 and 24 are connected to a public switch 26 that is connected to the PBX 14 by means of a trunk 28, as is well known in the art. Also shown in FIG. 1 are a number of telephones 30, 32, 34 and 36 for use by ACD agents. The PBX also supports other telephones 38, 40, 42 and 44 that are used by persons that are not ACD agents, but who are also employed at the calling center that operates the ACD system 10. The non-agent telephones are not critical to the invention. With the exception of the adjunct router 16, the components of FIG. 1 are contained within conventional telecommunication systems having ACD capability.

In general terms, ACD agents use the agent telephones 30, 32, 34 and 36 to receive and/or place telephone calls between a call center that employs the agents and the customer telephones 18-24. For example, a customer may use a home telephone 20 to place a telephone call to the company to order one of the company's products. The customer dials a general sales telephone number of the company. The public switch 26 routes the inbound telephone call to the PBX 14. The PBX then routes all inbound calls that are directed to the general sales telephone number to the ACD system 10 for rerouting to one of the individuals at the agent telephones. The adjunct router 16 selects the appropriate agent telephone in a manner to be described below.

The adjunct router 16 is an dynamically adaptive optimizing system that controls the ACD switching circuitry 12 to route inbound calls to selected agents at the telephones 30-36. The selected agent receives the inbound call and processes the transaction.

The adjunct router is carried out in a combination of computer hardware and software. The adjunct router may be physically implemented in a stand-alone computer that interfaces with the PBX 14, or may be physically attached to the PBX. In the preferred embodiment, the router is a separate component in order to facilitate installation and maintenance of the adjunct router, and to provide the ability to readily interface with computer data networks and to support standards-based computer software. However, the inventive method may be carried out within an implementation in which the router is not an adjunct component, but is instead installed within the conventional components of a PBX and ACD system.

It is also noted that the entire telephony system may be a so-called Voice over Internet Protocol (VOIP) system, allowing the PBX to be implemented in one or more stand alone computers, communicating over computer networks which support Internet Protocol, optionally with quality of service guarantees.

Figure 2:
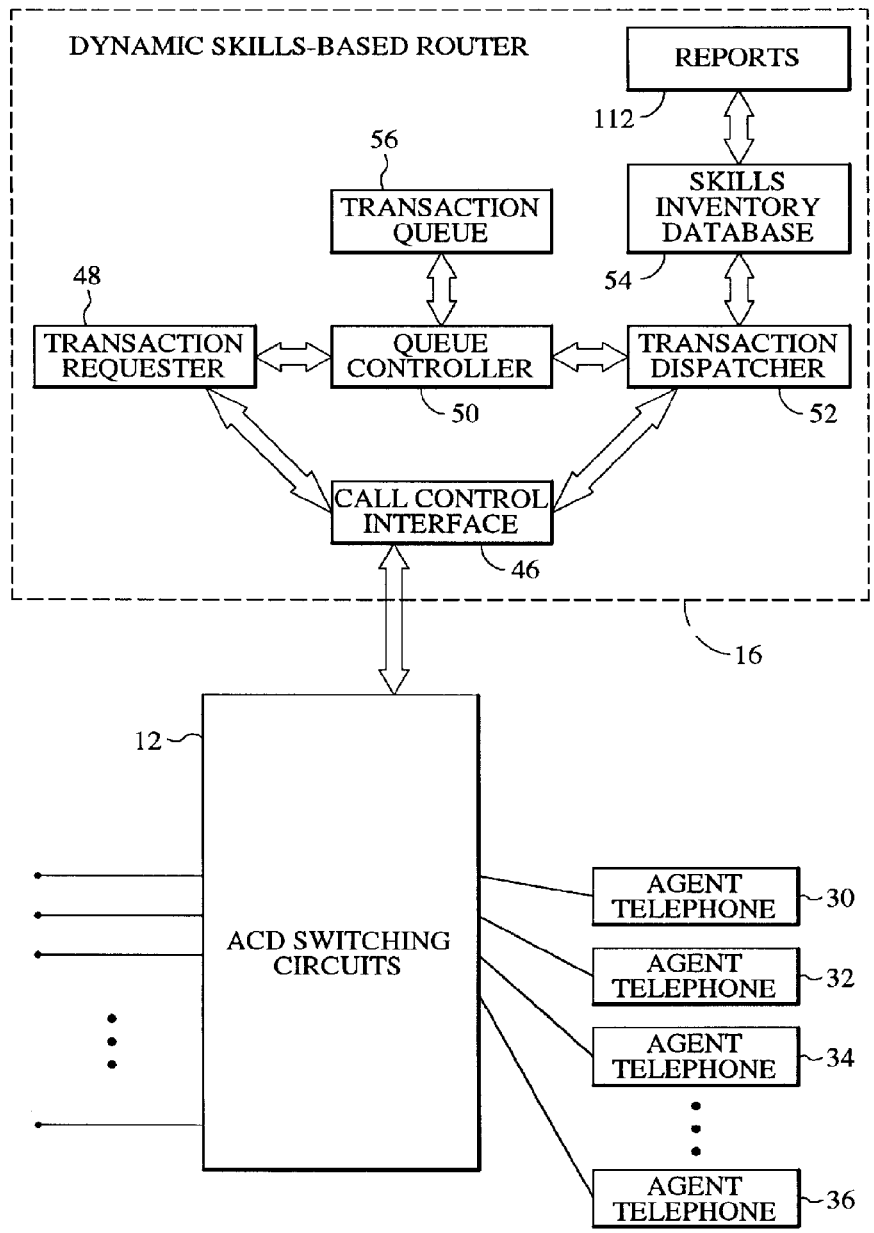
FIG. 2 is a flowchart describing the decision routine of the present invention.

Referring now to FIG. 2, the adjunct router 16 includes a call control interface 46 that establishes the coordination with the switching circuitry 12 of the ACD system. The call control interface may be a standard CSTA interface. A transaction requester 48, a queue controller 50, and a transaction dispatcher 52 may be separate routines of a computer program that establishes the router. A skills inventory database 54 may be stored on a hard disk and read into random access memory upon execution of the program. A transaction queue 56 may also be generated in random access memory during the execution of the program.

The adjunct router 16 may be used to control inbound or outbound calls or a combination of inbound and outbound calls. For example, if an outbound call is to be routed to a particular customer, the request will be received at the transaction requester 48 via the call control interface 46. Inbound or outbound calls are queued at the transaction queue 56. The transaction dispatcher 52 is used in the selection of a particular ACD agent for handling a queued call. The transaction dispatcher 52 may also select another agent to monitor the call in order to provide assistance and training to the selected agent.

As will be explained more fully below, the selection is determined based on a long term optimization algorithm, which balances call needs, agents skills, system preferences, and/or agent training.

The skills inventory database 54 stores a profile for each of the agents (and trainers, who may or may not also be agents) who utilize the agent telephones 30-36. The queue controller 50 coordinates operations involving transaction requests and transaction dispatches. When a queued call has been matched with a particular agent, the transaction dispatcher 52 causes the call control interface 46 to issue a command to the switching circuitry 12 of the PBX to route the queued call to the appropriate agent telephone corresponding to the selected agent. The transaction dispatcher also causes the queue controller 50 to delete the corresponding entry in the transaction queue 56. In other words, when a call is routed to an agent, it is removed from the list of call identifications waiting agent assignment.

For each ACD agent, a profile is created based on manual inputs, such as language proficiency, formal education and training, position, and the like, as well as automatically, based on actual performance metrics and analysis, and stored at the skills inventory database 54. A profile thus represents a synopsis of the skills and characteristics that an agent possesses, although it may not exist in a human readable or human comprehensible form.

Preferably, the profile includes a number of vectors representing different attributes, which are preferably independent, but need not be. The profile relates to both the level of ability, i.e. expertise, in each skill vector, as well as the performance of the agent, which may be a distinct criterion, with respect to that skill. In other words, an agent may be quite knowledgeable with respect to a product line, but nevertheless relatively slow to service callers. The profile, or an adjunct database file, may also include a level of preference that call management has for the agent to handle transactions that require particular skills versus transactions that require other skills, or other extrinsic considerations.

Figure 3:
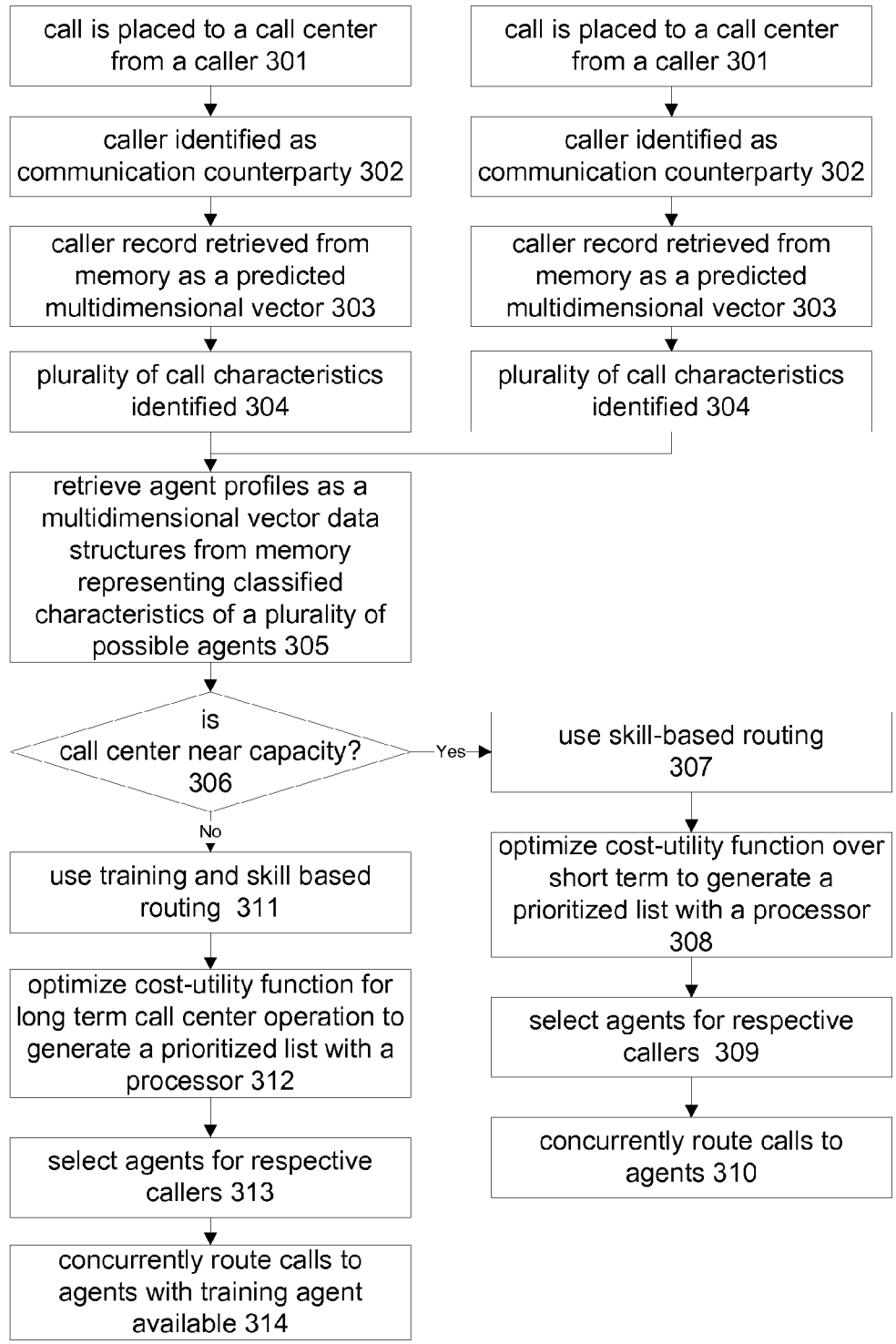
FIG. 3 is a flow chart showing a skill-training routing method according to the present invention.

FIG. 3 shows a flow chard of an incoming call routing algorithm according to a preferred embodiment of the present invention. A call is placed by a caller to a call center 301. The call is directed, through the public switched telephone network, although, calls or communications may also be received through other channels, such as the Internet, private branch exchange, intranet VOIP, etc. The source address of the call, for example the calling telephone number, IP address, or other identifier, is received to identify the caller 302. This identifier is then used to call up an associated database record 303, providing, for example, a prior history of interaction, a user record, or the like. In some instances, there will be no associated record, or in others, the identification may be ambiguous or incorrect. For example, a call from a PBX, wherein an unambiguous caller extension is not provided outside the network, a call from a pay phone, or the like. Therefore, the identity of the caller is then confirmed using voice or promoted DTMF codes, which may include an account number, transaction identifier, or the like.

During the identity confirmation process, the caller is also directed to provide certain details relating to the purpose of the call. For example, the may be directed to "press one for sales, two for service, three for technical support, four for returns, and five for other". Each selected choice, for example, could include a further menu, or an interactive voice response, or an option to record information. The information is then coded as a call characteristic vector 304. In some instances, a human operator will analyze the information, or directly interact with the caller to determine the nature of the call. Thus, a number of methods are available and may be employed to determine a significant amount of information about the caller and the nature of the call. Some of these techniques are well known in the art, while others are not generally employed, but the techniques are clearly available to those skilled in the art.

Each agent has a skill profile vector. This vector is developed based on various efficiency or productivity criteria. For example, in a sales position, productivity may be defined as sales volume or gross profits per call or per call minute, customer loyalty of past customers, or other appropriate metrics. In a service call, efficiency may be defined in terms of minutes per call, customer loyalty after the call, customer satisfaction during the call, successful resolution of the problem, or other metrics. These metrics may be absolute values, or normalized for the agent population, or both. The skill profile vector is stored in a database, and the profiles, which may be updated dynamically, of available or soon to be available agents, are retrieved from the database 305.

The optimization entails various information, which may include the caller characteristics, the call incident characterization, the agent profile(s), and/or various routing principles.

Under some circumstances, it is desired to implement a traditional skill-based call routing. For example, if peak instantaneous efficiency is desired, for example when the call center is near capacity 306, more advanced optimizations may be bypassed and a traditional skill based call routing algorithm 307 implemented, which optimizes a short term cost-utility function of the call center 308. An agent who can "optimally" handle the call is then selected 309, and the call routed to that agent 310.

Thus, in order to immediately optimize the call routing, the general principle is to route the call such that the sum of the utility functions of the calls be maximized while the cost of handling those calls be minimized. This optimization is generally known. However, this routing is not sensitive to the requirement to train agent, a continuing problem for call centers, which must constantly train agents.

According to a particular aspect of the invention, the various routing principles discussed above explicitly value training as a utility of handling a call 311, and thus a long-term optimization is implemented 312. The utility of caller satisfaction is also weighted, and thus the agent selected is generally minimally capable of handling the call. Thus, while the caller may be somewhat burdened by assignment to a trainee agent, the call center utility is maximized over the long term, and call center agents will generally increase in skill rapidly.

As for the cost side of the optimization, the cost of running a call center generally is dependent on required shift staffing, since other costs are generally constant. Accordingly, the training algorithm serves to minimize sub-locally optimal call routing during peak load periods, and thus would be expected to have no worse cost performance than traditional call centers. However, as the call center load is reduced, the call routing algorithm routes calls to trainee agents with respect to the call characteristics. This poses two costs. First, since the trainee is less skilled than a fully trained agent, the utility of the call will be reduced. Second, call center agent training generally requires a trainer be available to monitor and coach the trainee. While the trainer may be an active call center agent, and therefore part of the fixed overhead, there will be a marginal cost since the trainer agent might be assuming other responsibilities instead of training. For example, agents not consumed with inbound call handling may engage in outbound call campaigns.

Thus, an optimization is performed, using as at least one factor the value of training an agent with respect to that call 312, and an appropriate trainee agent selected 313.

In order to provide proper training, the trainer and trainee must both be available, and the call routed to both 314. Generally, the trainee has primary responsibility for the call, and the trainer has no direct communication with the caller. Therefore, the trainer may join the call after commencement, or leave before closing. However, routing a call which requires two agents to be simultaneously available poses some difficulties. In general, the trainer is an agent capable of handling the entire call alone, while the trainee may not be. Therefore, the trainer is a more important participant, and the initial principle in routing the training call is to ensure that a trainer is available. The trainer may then await availability of an appropriate trainee, or if none is imminently available, handle the call himself or herself.

On the other hand, where a specific training campaign is in place, and a high utility associated with agent training, then the availability of a specific trainee or class of trainees for a call having defined characteristics is particularly important. In that case, when an appropriate trainee is available, the call held in that agent's cue, and the call possibly commenced, awaiting a training agent's availability.

If the training is highly structured, it is also possible to assign the trainer and trainee agents in pairs, so that the two are always available for calls together.

The same techniques are available for outbound campaigns and/or mixed call centers. In this case, the cost of training is more pronounced, since agents idle for inbound tasks are generally assigned to outbound tasks, and thus the allocation of trainer agents and trainee agents generally results in both longer call duration and double the number of agents assigned per call. This cost may again be balanced by avoiding training during peak utility outbound calling hours and peak inbound calling hours; however, training opportunities should not be avoided absolutely.

Figure 4:
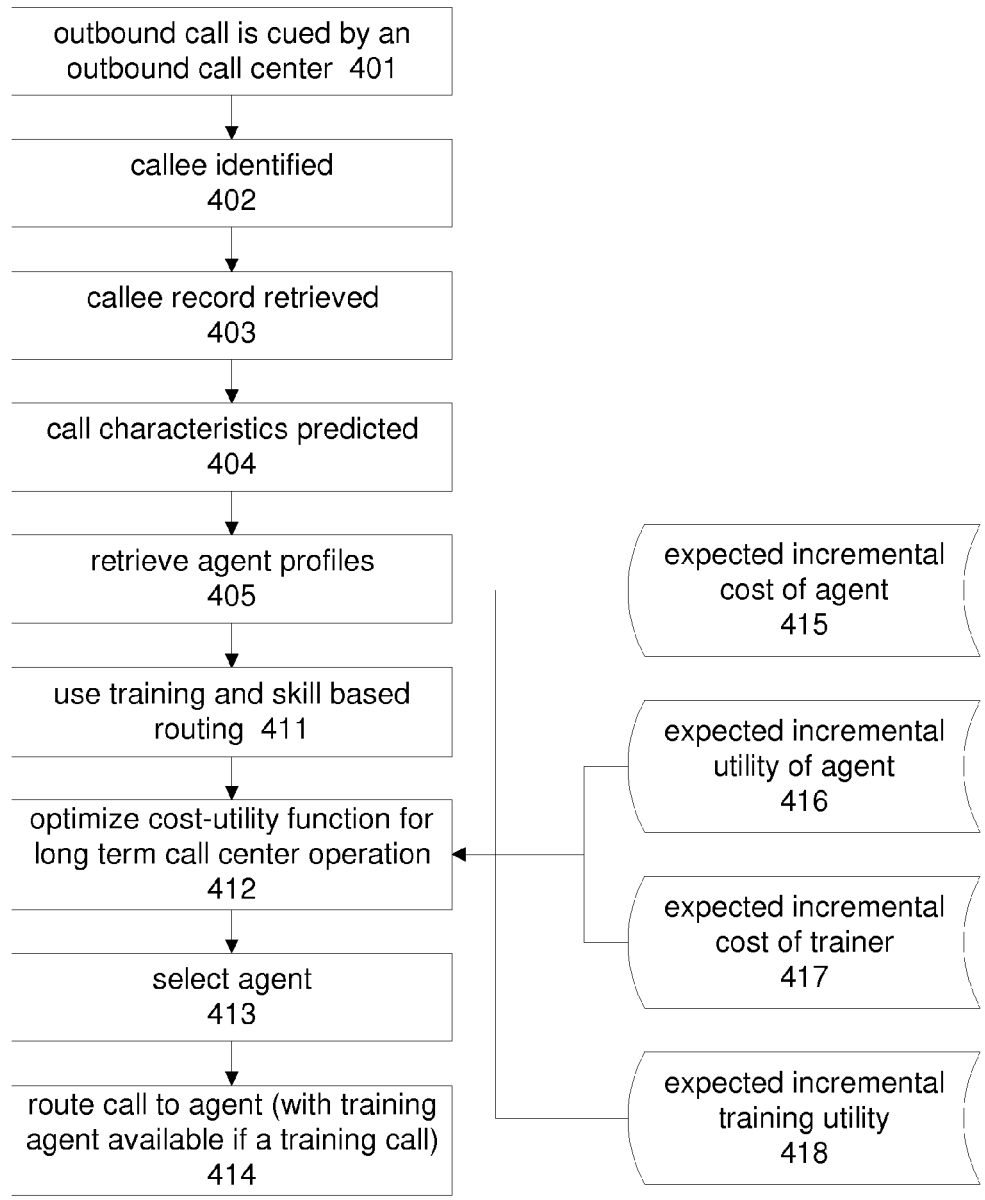
FIG. 4 is a flow chart of an outbound predictive dialer with a skill-training routing method according to the present invention.

As shown in FIG. 4, an outbound call is cued by, for example, a predictive dialer, in an outbound call center 401. The callee is identified 402, and a callee record retrieved 403. Based on available information, call characteristics are predicted 404. A set of agent profiles are retrieved 405, for example for the agents which are or will be available for the call. The call center routing algorithm may operate in a number of modes, and a training an skill based routing scheme is employed 411. The operation of this scheme is to optimize the cost-utility function for long term operation of the call center 412. This optimization considers the expected incremental cost of the agent 415, the expected incremental utility of the agent 416, the expected incremental cost of a trainer, if required for a training exercise 417, and the expected incremental utility of training the agent 418. On this basis, an gent is selected 413, and the call routed to the agent, and to the trainer as well if the call is a training call 414.

Thus, it is seen that in the method described with respect to FIG. 3, a choice is made based on whether the call center is near capacity 306, while in the method described with respect to FIG. 4, the choice is made as a part of the optimization 412. It should be understood that in either scenario, the choice as to whether to engage in a training call may be made discretely or as part of a single optimization.

In an outbound call campaign, the anticipated call characteristics may be relatively uniform; that is, there may be few known unique characteristics of a call, since these campaigns often target a homogenous audience. However, after the call is commenced, there is often a survey or other interaction which allows certain characteristics to be identified. In that case, the call may be maintained by the agent; transferred to another agent; if the agent is an appropriate trainee for the call, then an appropriate training agent obtained to shadow the call to provide assistance and training to the primary agent; or the agent may be an appropriate training agent for the call, and a trainee agent selected to shadow the call or substitute for the trainer.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

APPENDIX

The following references are considered pertinent to the present invention, and each is expressly incorporated herein by reference in its entirety:

U.S. Pat. Nos. 5,506,898; 5,511,117; 5,519,773; 5,524,147; 5,590,188; 5,633,922; 5,633,924; 5,715,307; 5,740,240; 5,768,360; 5,825,869; 5,848,143; 5,870,464; 5,878,130; 5,901,214; 5,905,792; 5,907,608; 5,910,982; 5,915,011; 5,917,903; 5,923,745; 5,926,539; 5,933,492; 5,940,496; 5,940,947; 5,946,387; 5,953,332; 5,953,405; 5,956,397; 5,960,073; 5,963,632; 5,970,134; 5,978,465; 5,982,868; 5,987,116; 5,987,118; 5,991,391; 5,991,392; 5,991,395; 5,995,614; 5,995,615; 5,999,965; 6,002,760; 6,005,931; 6,044,146; 6,058,435; 6,061,347; 6,064,667; 6,072,864; 6,104,801; 6,115,462; 6,118,865; 6,122,358; 6,122,360; 6,122,364; 6,128,380; 6,134,530; 6,147,975; 6,157,655; 6,175,563; 6,175,564; 6,185,292; 6,223,165; 6,226,289; 6,229,888; 6,230,197; 6,233,332, and U.S. patent application Ser. No. 01/000,0458 A1.

U.S. Pat. No. 6,243,684 Directory assistance system and method utilizing a speech recognition system and a live operator U.S. Pat. No. 6,230,197 Method and apparatus for rules-based storage and retrieval of multimedia interactions within a communication center U.S. Pat. No. 6,229,888 System and method for operating a plurality of call centers U.S. Pat. No. 6,226,360 System and method for delivery of pre-recorded voice phone messages U.S. Pat. No. 6,226,287 System and method for integrating voice on network with traditional telephony U.S. Pat. No. 6,212,178 Method and apparatus for selectively presenting media-options to clients of a multimedia call center U.S. Pat. No. 6,208,970 Method and system for estimation of a source of a voice signal U.S. Pat. No. 6,205,207 Telephone transaction processing as a part of a call transport U.S. Pat. No. 6,201,950 Computer-controlled paging and telephone communication system and method U.S. Pat. No. 6,192,413 Method and system for process queue communications routing U.S. Pat. No. 6,192,121 Telephony server application program interface API U.S. Pat. No. 6,185,283 Telephone system providing personalized telephone features U.S. Pat. No. 6,178,240 Method and apparatus for entertaining callers in a queue U.S. Pat. No. 6,173,052 Blending communications in a call center U.S. Pat. No. 6,170,011 Method and apparatus for determining and initiating interaction directionality within a multimedia communication center U.S. Pat. No. RE37,001 Interactive call processor to facilitate completion of queued calls U.S. Pat. No. 6,157,711 Multiple party telephone control system U.S. Pat. No. 6,154,535 Methods and system for obtaining processing information relating to a communication U.S. Pat. No. 6,154,528 System and method for storing and transferring information tokens in a low network communication U.S. Pat. No. 6,151,387 Telephonic-interface game control system U.S. Pat. No. 6,148,065 Telephonic-interface statistical analysis system U.S. Pat. No. 6,144,737 Trunk interface circuit having function of battery feed to central office U.S. Pat. No. 6,137,870 System for providing caller information to called party via call standard data field U.S. Pat. No. 6,137,862 Failover mechanism for computer/telephony integration monitoring server U.S. Pat. No. 6,134,530 Rule based routing system and method for a virtual sales and service center U.S. Pat. No. 6,130,937 System and process for automatic storage, enforcement and override of consumer do-not-call requests U.S. Pat. No. 6,128,376 Change of equal access carrier notification U.S. Pat. No. 6,125,178 Method and apparatus for enabling interaction between callers with calls positioned in a queue U.S. Pat. No. 6,122,484 Method and apparatus for processing telephone calls U.S. Pat. No. 6,122,364 Internet network call center U.S. Pat. No. 6,122,358 Operator connection control method U.S. Pat. No. 6,115,693 Quality center and method for a virtual sales and service center U.S. Pat. No. 6,102,970 System and method for optimizing a program containing a number of the flows through flow branches U.S. Pat. No. 6,098,069 Data managing method and data managing device using the same for manipulating data independently from networks U.S. Pat. No. 6,097,806 ACD with multi-lingual agent position U.S. Pat. No. 6,084,943 Diagnostic device for a telephone system U.S. Pat. No. 6,070,142 Virtual customer sales and service center and method U.S. Pat. No. 6,067,348 Outbound message personalization U.S. Pat. No. 6,064,973 Context manager and method for a virtual sales and service center U.S. Pat. No. 6,064,731 Arrangement for improving retention of call center's customers U.S. Pat. No. 6,064,730 Customer-self routing call center U.S. Pat. No. 6,058,435 Apparatus and methods for responding to multimedia communications based on content analysis U.S. Pat. No. 6,055,307 System and method for selecting agent destinations and monitoring calls made to network customers
U.S. Pat. No. 6,052,453 Coin operated telephone auditor
U.S. Pat. No. 6,049,599 Churn amelioration system and method therefor
U.S. Pat. No. 6,044,368 Method and apparatus for multiple agent commitment tracking and notification
U.S. Pat. No. 6,044,149 Device for detecting DTMF tones
U.S. Pat. No. 6,044,135 Telephone-interface lottery system
U.S. Pat. No. 6,041,118 Architecture for telephone set
U.S. Pat. No. 6,041,116 Method and apparatus for controlling outbound calls
U.S. Pat. No. 6,035,021 Telephonic-interface statistical analysis system
U.S. Pat. No. 6,031,899 Method and apparatus for identifying type of call
U.S. Pat. No. 6,026,156 Enhanced call waiting
U.S. Pat. No. 6,026,149 Method and apparatus for managing telecommunications
U.S. Pat. No. 6,021,428 Apparatus and method in improving e-mail routing in an internet protocol network telephony call-in-center
U.S. Pat. No. 6,021,190 Method and apparatus for receiving and processing an incoming call
U.S. Pat. No. 6,021,114 Method and system for utilizing communications lines
U.S. Pat. No. 6,018,579 Call center services for local calls using local number portability
U.S. Pat. No. 6,016,344 Telephonic-interface statistical analysis system
U.S. Pat. No. 6,014,439 Method and apparatus for entertaining callers in a queue
U.S. Pat. No. 6,011,845 Method and system for two-way call holding using an intelligent communication device
U.S. Pat. No. 6,009,149 Automated calling system with database updating by callee
U.S. Pat. No. 6,005,928 Method and system for automatic distribution addressing
U.S. Pat. No. 6,005,534 Digital information system
U.S. Pat. No. 6,002,760 Intelligent virtual queue
U.S. Pat. No. 5,995,948 Correspondence and chargeback workstation
U.S. Pat. No. RE36,416 Method and apparatus for dynamic and interdependent processing of inbound calls and outbound calls
U.S. Pat. No. 5,991,761 Method of reorganizing a data entry database
U.S. Pat. No. 5,991,604 Ring detecting circuit and method for wireless/wired composite telephone
U.S. Pat. No. 5,991,393 Method for telephony call blending
U.S. Pat. No. 5,987,116 Call center integration with operator services databases
U.S. Pat. No. 5,987,115 Systems and methods for servicing calls by service agents connected via standard telephone lines
U.S. Pat. No. 5,982,857 Voice recording method and system providing context specific storage and retrieval
U.S. Pat. No. 5,978,471 Method and device for detecting a ringtrip
U.S. Pat. No. 5,978,467 Method and apparatus for enabling interaction between callers with calls positioned in a queue
U.S. Pat. No. 5,978,465 Method and apparatus for allocating resources in a call center
U.S. Pat. No. 5,974,135 Teleservices computer system, method, and manager application for integrated presentation of concurrent interactions with multiple terminal emulation sessions
U.S. Pat. No. 5,974,120 Telephone interface call processing system with call selectivity
U.S. Pat. No. 5,970,132 Call distributor
U.S. Pat. No. 5,966,429 Telephone transaction processing as a part of a call transport
U.S. Pat. No. 5,963,635 Method and apparatus for providing result-oriented customer service
U.S. Pat. No. 5,956,392 Private branch exchange apparatus
U.S. Pat. No. 5,949,863 Coin operated telephone auditor
U.S. Pat. No. 5,949,854 Voice response service apparatus
U.S. Pat. No. 5,949,852 Method for recording messages for absent parties
U.S. Pat. No. 5,946,394 Isolation amplifier with hook switch control
U.S. Pat. No. 5,946,388 Method and apparatus for priority queuing of telephone calls
U.S. Pat. No. 5,943,403 Customized, billing-controlled call bridging system
U.S. Pat. No. 5,940,813 Process facility management matrix and system and method for performing batch, processing in an on-line environment
U.S. Pat. No. 5,940,497 Statistically-predictive and agent-predictive call routing
U.S. Pat. No. 5,940,493 System and method for providing directory assistance information
U.S. Pat. No. 5,937,390 On-line advertising system and its method
U.S. Pat. No. 5,937,055 Method and apparatus for routing telephone calls between alternate telephone service providers
U.S. Pat. No. 5,933,480 Method for billing and controlling fraud in providing pay information services
U.S. Pat. No. 5,930,339 Leaving a message on a held connection
U.S. Pat. No. 5,926,528 Call pacing method
U.S. Pat. No. 5,924,016 Control and monitoring apparatus and method for a telephone system
U.S. Pat. No. 5,923,746 Call recording system and method for use with a telephonic switch
U.S. Pat. No. 5,918,213 System and method for automated remote previewing and purchasing of music, video, software, and other multimedia products
U.S. Pat. No. 5,917,893 Multiple format telephonic interface control system
U.S. Pat. No. 5,914,951 System and method for controlling and monitoring communication between customers and customer service representatives
U.S. Pat. No. 5,913,195 System and method for developing VRU voice dialogue
U.S. Pat. No. 5,912,947 Public notification system and method
U.S. Pat. No. 5,907,601 Call pacing method
U.S. Pat. No. 5,905,979 Abstract manager system and method for managing an abstract database
U.S. Pat. No. 5,903,641 Automatic dynamic changing of agents' call-handling assignments
U.S. Pat. No. 5,901,209 Caller ID substitution for selected telephone callers
U.S. Pat. No. 5,898,762 Telephonic-interface statistical analysis system
U.S. Pat. No. 5,898,759 Telephone answering machine with on-line switch function
U.S. Pat. No. 5,896,446 Coin operated telephone auditor U.S. Pat. No. 5,894,505 Telephone answering machine
U.S. Pat. No. 5,893,902 Voice recognition bill payment system with speaker verification and confirmation
U.S. Pat. No. 5,878,126 Method for routing a call to a destination based on range identifiers for geographic area assignments
U.S. Pat. No. 5,872,833 Telephone transaction processing as a part of a call transport
U.S. Pat. No. 5,867,572 Customer queuing arrangement
U.S. Pat. No. 5,867,564 Time-of-day clock synchronization in communications networks
U.S. Pat. No. 5,867,559 Real-time, on-line, call verification system
U.S. Pat. No. 5,857,013 Method for automatically returning voice mail messages
U.S. Pat. No. 5,854,832 Monitoring system and method used in automatic call distributor for timing incoming telephone calls
U.S. Pat. No. 5,850,428 Message management system and method
U.S. Pat. No. 5,848,143 Communications system using a central controller to control at least one network and agent system
U.S. Pat. No. 5,841,852 Method and system for telecommunications language support
U.S. Pat. No. 5,838,779 Adjunct controller for a telephone system
U.S. Pat. No. 5,838,772 Voice services equipment
U.S. Pat. No. 5,835,572 Customized, billing controlled call bridging system
U.S. Pat. No. 5,828,734 Telephone interface call processing system with call selectivity
U.S. Pat. No. 5,828,731 Method and apparatus for non-offensive termination of an outbound call and for detection of an answer of an outbound call by an answering machine
U.S. Pat. No. 5,825,869 Call management method and system for skill-based routing
U.S. Pat. No. 5,822,410 Churn amelioration system and method therefor
U.S. Pat. No. 5,822,401 Statistical diagnosis in interactive voice response telephone system
U.S. Pat. No. 5,822,400 Call record scheduling system and method
U.S. Pat. No. 5,815,566 Apparatus and method for dynamic inbound/outbound call management and for scheduling appointments
U.S. Pat. No. 5,815,554 Method and system for indicating operator availability
U.S. Pat. No. 5,815,551 Telephonic-interface statistical analysis system
U.S. Pat. No. 5,812,642 Audience response monitor and analysis system and method
U.S. Pat. No. 5,806,071 Process and system for configuring information for presentation at an interactive electronic device
U.S. Pat. No. 5,799,077 Method of and apparatus for automatic dialing
U.S. Pat. No. 5,796,816 Device and method for cleaning telephone number list
U.S. Pat. No. 5,796,791 Network based predictive dialing
U.S. Pat. No. 5,793,846 Telephonic-interface game control system
U.S. Pat. No. 5,787,159 Use of caller ID information
U.S. Pat. No. 5,787,156 Telephonic-interface lottery system
U.S. Pat. No. 5,774,537 Method and apparatus for displaying multiple languages in key phone system
U.S. Pat. No. 5,768,355 Three-way call detection system
U.S. Pat. No. 5,761,285 Universal telephony application client that is configurable from a profile for a telephone call campaign
U.S. Pat. No. 5,748,711 Telephone transaction processing as a part of call transport
U.S. Pat. No. 5,742,675 Method and apparatus for automatically distributing calls to available logged-in call handling agents
U.S. Pat. No. 5,740,233 System and method for statistical diagnosis of the operation of an automated telephone system
U.S. Pat. No. RE35,758 Voice/data-formatted telephone information storage and retrieval system
U.S. Pat. No. 5,729,600 Automatic call distributor with automated voice responsive call servicing system and method
U.S. Pat. No. 5,727,154 Program synchronization on first and second computers by determining whether information transmitted by first computer is an acceptable or unacceptable input to second computer program
U.S. Pat. No. 5,724,418 Call distributor
U.S. Pat. No. 5,717,741 Method for handling telephonic messages
U.S. Pat. No. 5,703,935 Automated telephone operator services
U.S. Pat. No. 5,701,295 Variable communication bandwidth for providing automatic call back and call hold
U.S. Pat. No. 5,699,418 Telephone circuit
U.S. Pat. No. 5,696,818 Delay announcement group and time controller for a telephone system
U.S. Pat. No. 5,696,809 Advanced intelligent network based computer architecture for concurrent delivery of voice and text data using failure management system
U.S. Pat. No. 5,692,034 Customized, billing-controlled call bridging system
U.S. Pat. No. 5,692,033 AIN queuing for call-back system
U.S. Pat. No. 5,687,225 System for adding outbound dialing to inbound call distributors
U.S. Pat. No. 5,684,863 Telephonic-interface statistical analysis system
U.S. Pat. No. 5,675,637 Method for automatically obtaining and presenting data from multiple data sources
U.S. Pat. No. 5,661,283 Automated patching between ATM and consultant
U.S. Pat. No. 5,657,074 Apparatus for reproducing still images with music
U.S. Pat. No. 5,655,014 Switching device independent computer-telephone integration system
U.S. Pat. No. 5,655,013 Computer-based method and apparatus for controlling, monitoring, recording and reporting telephone access
U.S. Pat. No. 5,652,788 Key telephone apparatus
U.S. Pat. No. 5,646,988 Incoming call controller for preferentially connecting a waiting call based on number of previous unsuccessful call attempts
U.S. Pat. No. 5,646,986 Network communication system with global event calendar information and trunk allocation
U.S. Pat. No. 5,638,436 Voice detection
U.S. Pat. No. 5,636,268 Communication system with queues
U.S. Pat. No. 5,636,267 Cleaning system for telephone number list
U.S. Pat. No. 5,633,917 Remote-control telephone answering system and method
U.S. Pat. No. 5,625,682 Help desk improvement
U.S. Pat. No. 5,625,676 Method and apparatus for monitoring a caller's name while using a telephone U.S. Pat. No. 5,619,557 Telephone switching system and method for controlling incoming telephone calls to remote agents and for collecting and providing call data
U.S. Pat. No. 5,610,978 Ring discriminator
U.S. Pat. No. 5,610,774 Audio sound recording/reproducing apparatus using semiconductor memory
U.S. Pat. No. 5,600,710 Method for providing a recorded message to a telephone caller when called number is busy
U.S. Pat. No. 5,594,791 Method and apparatus for providing result-oriented customer service
U.S. Pat. No. 5,594,790 Method for selecting and controlling the automatic dialing of a call record campaign
U.S. Pat. No. 5,592,543 Method and system for allocating agent resources to a telephone call campaign
U.S. Pat. No. 5,590,171 Method and apparatus for communications monitoring
U.S. Pat. No. 5,588,049 Method for the automatic insertion of removal of a calling number identification (CNID) blocking prefix from within a telephone number in a personal computer based telephone management system
U.S. Pat. No. 5,586,179 System and method for adding and integrating outbound calling and overall system control to an existing inbound telephone system
U.S. Pat. No. 5,581,607 Customized, billing-controlled call bridging system
U.S. Pat. No. 5,581,604 Method and apparatus for processing an incoming call in a communication system
U.S. Pat. No. 5,581,602 Non-offensive termination of a call detection of an answering machine
U.S. Pat. No. 5,579,383 Calling terminal controlled call coverage
U.S. Pat. No. 5,579,377 Remote-control telephone answering system and method
U.S. Pat. No. 5,577,112 Telephony system with supervisory management center and parameter testing with alerts
U.S. Pat. No. 5,574,784 Dynamic admission control for telecommunications relay service with text-to-speech synthesis
U.S. Pat. No. 5,572,586 Communication control apparatus and method and communication exchange apparatus and method
U.S. Pat. No. 5,572,576 Telephone answering device linking displayed data with recorded audio message
U.S. Pat. No. 5,570,419 System and method for an improved predictive dialer
U.S. Pat. No. 5,568,540 Method and apparatus for selecting and playing a voice mail message
U.S. Pat. No. 5,561,711 Predictive calling scheduling system and method
U.S. Pat. No. 5,559,878 Telephonic communications answering and callback processing system
U.S. Pat. No. 5,559,867 Automated calling system with database updating
U.S. Pat. No. 5,557,668 Call distribution system with distributed control of calls and data distribution
U.S. Pat. No. 5,555,295 Service and information management system for a telecommunications network
U.S. Pat. No. 5,555,290 Long distance telephone switching system with enhanced subscriber services
U.S. Pat. No. 5,546,456 Telecommunication system with inbound call responsive predictive outdialing system and method
U.S. Pat. No. 5,546,452 Communications system using a central controller to control at least one network and agent system
U.S. Pat. No. 5,544,232 Call distributor with automatic pre-announcement system and method
U.S. Pat. No. 5,544,220 System for integrating a stand alone inbound automatic call distributor and an outbound automatic call dialer
U.S. Pat. No. 5,537,470 Method and apparatus for handling in-bound telemarketing calls
U.S. Pat. No. 5,535,257 Method and apparatus for managing telephone calls in a selective call radio system controller
U.S. Pat. No. 5,533,109 Telecommunication system with user modifiable PBX terminating call feature controller and method
U.S. Pat. No. 5,533,107 Method for routing calls based on predetermined assignments of callers geographic locations
U.S. Pat. No. 5,533,103 Calling system and method
U.S. Pat. No. 5,530,931 Method and apparatus for providing a look ahead feature for enhanced call forwarding in a telecommunications system
U.S. Pat. No. 5,528,666 Personal phone expansion system
U.S. Pat. No. 5,526,417 Automatic call distributor with automated postconversation message system
U.S. Pat. No. 5,524,140 Telephone answering device linking displayed data with recorded audio message
U.S. Pat. No. 5,519,773 Call sharing for inbound and outbound call center agents
U.S. Pat. No. 5,517,566 Method for allocating agent resources to multiple telephone call campaigns
U.S. Pat. No. 5,515,421 Automatic batch broadcast system
U.S. Pat. No. 5,511,112 Automated voice system for improving agent efficiency and improving service to parties on hold
U.S. Pat. No. 5,506,898 Expected wait-time indication arrangement
U.S. Pat. No. 5,502,762 System and method for simultaneously controlling ringing at local and remote telephones
U.S. Pat. No. 5,495,528 Digital telephone control interface system
U.S. Pat. No. 5,495,523 Method for low priority telephony system assisted dialing
U.S. Pat. No. 5,493,690 Foldable portable telephone set
U.S. Pat. No. 5,485,506 Method for designating recorded messages
U.S. Pat. No. 5,481,596 Auxiliary baseband telephone interface for an answering machine
U.S. Pat. No. 5,479,501 Far-end disconnect detector for telephony systems
U.S. Pat. No. 5,479,487 Calling center employing unified control system
U.S. Pat. No. 5,467,391 Integrated intelligent call blending
U.S. Pat. No. 5,465,286 Apparatus for supervising an automatic call distribution telephone system
U.S. Pat. No. 5,459,781 Selectively activated dual tone multi-frequency detector
U.S. Pat. No. 5,448,631 Apparatus for handling features in a telephone network
U.S. Pat. No. 5,448,624 Telephone network performance monitoring method and system
U.S. Pat. No. 5,442,693 Integrated operator console
U.S. Pat. No. 5,436,967 Held party call-back arrangement
U.S. Pat. No. 5,434,906 Method and apparatus for processing an incoming call in a communication system
U.S. Pat. No. 5,432,835 Telephone device for amplifying opposite party's voice after user's telephone is placed on-hook
U.S. Pat. No. 5,430,792 Automated telephone calling system
U.S. Pat. No. 5,425,093 System for integrating a stand alone inbound automatic call distributor and a outbound automatic call dialer
U.S. Pat. No. 5,420,919 Telephone line current modulator U.S. Pat. No. 5,420,852 Digital switching system connecting buses with incompatible protocols and telephone answering system and private automatic branch exchange with integrated voice and textual message recording U.S. Pat. No. 5,402,474 System, data processing method and program to provide a programmable interface between a workstation and an archive server to automatically store telephone transaction information U.S. Pat. No. 5,400,393 Voice mail digital telephone answering device U.S. Pat. No. 5,390,236 Telephone answering device linking displayed data with recorded audio message U.S. Pat. No. 5,381,470 Supervisory management center with parameter testing and alerts U.S. Pat. No. 5,365,575 Telephonic-interface lottery system U.S. Pat. No. 5,359,645 Voice-data telephonic interface control system U.S. Pat. No. 5,351,285 Multiple format telephonic interface control system U.S. Pat. No. 5,341,414 Calling number verification service U.S. Pat. No. 5,341,412 Apparatus and a method for predictive call dialing U.S. Pat. No. 5,333,190 Telephone ring detection method and apparatus U.S. Pat. No. 5,329,579 Modular adjunct processor made of identical multi-function modules adaptable under direction of one of them to perform any of the adjunct-processor functions U.S. Pat. No. 5,327,490 System and method for controlling call placement rate for telephone communication systems U.S. Pat. No. 5,321,745 Adaptive efficient single/dual tone decoder apparatus and method for identifying call-progression signals U.S. Pat. No. 5,319,703 Apparatus and method for identifying speech and call-progression signals U.S. Pat. No. 5,313,516 Telephone answering device with automatic function U.S. Pat. No. 5,311,577 Data processing system, method and program for constructing host access tables for integration of telephony data with data processing systems U.S. Pat. No. 5,311,574 Automatic customer call back for automatic call distribution systems U.S. Pat. No. 5,309,505 Automated voice system for improving agent efficiency and improving service to parties on hold U.S. Pat. No. 5,309,504 Automated identification of attendant positions in a telecommunication system U.S. Pat. No. 5,297,195 Method and apparatus for automatic telephone scheduling system U.S. Pat. No. 5,297,146 Communication terminal apparatus and its control method U.S. Pat. No. 5,289,530 Method and apparatus for vocally communicating to a caller at a remote telephone station synthesized speech of stored special service information U.S. Pat. No. 5,283,818 Telephone answering device linking displayed data with recorded audio message U.S. Pat. No. 5,276,732 Remote workstation use with database retrieval system U.S. Pat. No. 5,253,289 Terminal connection device U.S. Pat. No. 5,251,252 Telephone interface call processing system with call selectivity U.S. Pat. No. 5,239,574 Methods and apparatus for detecting voice information in telephone-type signals U.S. Pat. No. 5,224,153 Voice-data telephonic interface control system U.S. Pat. No. 5,218,635 Low-frequency alternating current signal detector, in particular for central office line interface circuits U.S. Pat. No. 5,214,688 Method and apparatus for dynamic and interdependent processing of inbound calls and outbound calls U.S. Pat. No. 5,185,786 Automatic call center overflow retrieval system U.S. Pat. No. 5,168,517 Apparatus and methods for selectively forwarding telephone calls U.S. Pat. No. 5,166,974 Interactive call processor to facilitate completion of queued calls U.S. Pat. No. 5,164,981 Voice response system with automated data transfer U.S. Pat. No. 5,163,087 Delivery of customer data base key using automatic number identification U.S. Pat. No. 5,163,083 Automation of telephone operator assistance calls U.S. Pat. No. 5,161,181 Automatic number identification blocking system U.S. Pat. No. 5,128,984 Telephone interface call processing system with call selectivity U.S. Pat. No. 5,121,422 Voice message storage device including at least two analog recording mediums U.S. Pat. No. 5,103,449 PBX transparent ANI and DNIS using VRU U.S. Pat. No. 5,097,528 System for integrating telephony data with data processing systems U.S. Pat. No. 5,081,711 Computer peripheral device control and communication system U.S. Pat. No. 5,077,789 Remotely commanded telephone switch enhancing system U.S. Pat. No. 5,073,929 Voice-data telephonic control system U.S. Pat. No. 5,070,526 Signal analyzing system U.S. Pat. No. 5,070,525 Method for avoiding call blocking U.S. Pat. No. 5,063,522 Multi-user, artificial intelligent expert system U.S. Pat. No. 5,048,075 Telephonic-interface statistical analysis system U.S. Pat. No. 5,040,208 Coordinated voice and data display having temporary storage of transaction data U.S. Pat. No. 5,020,097 Telephone with data setting by remote control U.S. Pat. No. 5,020,095 Interactive call distribution processor U.S. Pat. No. 5,016,270 Expanded telephone data organization system U.S. Pat. No. 5,014,298 Voice-data telephonic control system U.S. Pat. No. 5,007,078 Automated order entry recording method and apparatus U.S. Pat. No. 5,007,000 Classification of audio signals on a telephone line U.S. Pat. No. 4,998,272 Personal voice mail system U.S. Pat. No. 4,987,587 Method and apparatus for providing 800 number service U.S. Pat. No. 4,979,171 Announcement and tone code generator for telephonic network and method U.S. Pat. No. 4,975,841 Method and apparatus for reporting customer data U.S. Pat. No. 4,958,371 Method and apparatus for determining when a telephone handset is off-hook U.S. Pat. No. 4,941,168 System for the recognition of automated telephone answering devices and delivery of prerecorded messages to such devices U.S. Pat. No. 4,935,956 Automated public phone control for charge and collect billing U.S. Pat. No. 4,933,964 Pacing of telephone calls for call origination management systems U.S. Pat. No. 4,930,150 Telephonic interface control system
U.S. Pat. No. 4,924,501 Dial pulse selection
U.S. Pat. No. 4,894,857 Method and apparatus for customer account servicing
U.S. Pat. No. 4,878,243 Call forwarding system and method
U.S. Pat. No. 4,866,754 Automatic telephone answering machine utilizing voice synthesis
U.S. Pat. No. 4,852,149 Automated call filter
U.S. Pat. No. 4,807,279 Remotely programmable call forwarding control device
U.S. Pat. No. 4,797,911 Customer account online servicing system
U.S. Pat. No. 4,768,221 Remote reprogramming system for telephone call forwarding service
U.S. Pat. No. 4,677,663 Telephone answering and call forwarding improvement
U.S. Pat. No. 4,286,118 Data distribution system for private automatic branch exchange

What is claimed is:

1. A method, comprising:
   storing in a memory a data structure representing a plurality of characteristics of a plurality of potential contacts and a weighting of importance of the respective characteristics;
   processing the data structure using at least one automated processor, to determine a priority of a plurality of respective associations of potential contacts based on, for each respective association of potential contacts, an optimization of at least:
      (i) a utility function of at least the plurality of characteristics of the respective association of potential contacts and the weighting of importance of the represented characteristics, and
      (ii) a cost function of the respective association of potential contacts;
   selecting a respective association of potential contacts based on the determined priority of the plurality of respective associations; and
   communicating at least an identification of the selected respective association of potential contacts through a communication port.

2. The method according to claim 1, wherein the respective association of the plurality of potential contacts is mutually exclusive with at least one other respective association of the plurality of potential contacts, and the respective association of the plurality of potential contacts is selected based on a higher priority than a non-selected mutually exclusive other respective association of the plurality of potential contacts.

3. The method according to claim 1, further comprising:
   determining a set of communications counterparties available for concurrent communications with the plurality of potential contacts; and
   the processing of the data structure using the at least one automated system determines a priority of respective associations of potential contacts with communications counterparties based on an optimization, for each respective association of a potential contact, at least:
      (i) seeking a maximization of a utility function of at least the plurality of characteristics of the respective association of potential contacts and the weighting of importance of the represented characteristics with respect to a communications counterparty, and
      (ii) seeking a minimization of a cost function of the respective association of potential contact with the communications counterparty;
   said selecting comprises selecting a plurality of respective associations of a respective potential contact with a respective communications counterparty based on the determined priority of respective associations of potential contacts; and
   concurrently communicating in accordance with the selected plurality of respective associations.

4. The method according to claim 1, wherein the plurality of characteristics have a utility value, an association of the potential contacts is associated with a predicted change in the utility value of the plurality of characteristics, and the priority is further determined based on an optimization of at least:
   (iii) the predicted change in the utility value of the plurality of characteristics.

5. The method according to claim 1, wherein the cost function is sensitive to an immediate cost and a long term cost.

6. The method according to claim 1, wherein the utility function is sensitive to an immediate benefit and a long term benefit.

7. The method according to claim 3, wherein the plurality of respective associations is selected to achieve optimum efficiency.

8. The method according to claim 1, wherein each potential contact has characteristics which are classified as a multidimensional vector, representing at least one requirement, the processing ensuring that the at least one requirement is satisfied for each communicated identification.

9. The method according to claim 1, wherein the plurality of potential contacts comprises a set of humans, and the association of potential contacts comprises a communication between respective humans.

10. The method according to claim 1, wherein the potential contacts comprise a call center agents.

11. The method according to claim 9, wherein the communication between respective humans changes at least one of the plurality of characteristics of the respective potential contact, further comprising updating the data structure to reflect the change in the at least one of the plurality of characteristics of the respective potential contact.

12. The method according to claim 11, wherein the change in the at least one of the plurality of characteristics of the respective potential contact is a factor included in at least one of the utility function and the cost function.

13. A communication system, comprising:
   a memory configured to store a data structure representing a plurality of characteristics, and a weighting of importance of respective characteristics, for each of a plurality of potential contacts;
   at least one automated processor configured to process the data structure, to produce an optimized set comprising a plurality of communications pairs involving potential contacts based on, for each communications pair, a utility function and a cost function of at least the plurality of characteristics and the weighting of importance of respective characteristics for the communications pair;
   generate a prioritized list of communications pairs based on the optimized set, and select a communication pair involving a potential contact from the prioritized list; and
   an output port configured to output a signal to identify or control a communication with the selected communication pair involving the potential contact.

14. The system according to claim 13, wherein the plurality of communications pairs involving a respective potential contact are mutually exclusive, and the at least one automated processor is further configured to optimize mutually exclusive communication of a plurality of the potential contacts.

15. The system according to claim 13, wherein the at least one automated processor is further configured to determine a set of communications counterparties available for concurrent communications with the potential contacts forming the communications pairs, and to concurrently communicate between a plurality of selected potential contacts from the list and the communications counterparties selectively in dependence on a relationship of the available communications counterparties for concurrent communications with the potential contacts, and the data structure further represents characteristics of a plurality of communications counterparties.

16. The system according to claim 13, wherein the at least one automated processor is further configured to predict a change in a characteristic of the potential contact, and to update the data structure to reflect the predicted change in the characteristic of the respective potential contact, for use in a subsequent generation of a prioritized list.

17. The system according to claim 13, further comprising a queue configured to concurrently store identifiers of a plurality of requests for communication, each request for communication having a respective profile, wherein the at least one automated processor is further configured to analyze potential communications pairs involving each respective request for communication in the queue and an available potential contact based on the optimization of the utility function, cost function and weighting of importance with respect to the profile of the respective request for communication.

18. A method, comprising:
storing a plurality of first characteristics of a plurality of potential contacts in a memory, the plurality of first characteristics having a utility value;
receiving information with respect to at least one opportunity, each having at least one respective second characteristic;
processing the plurality of first characteristics and the at least one second characteristic with an automated data processor, to optimize a set of potential communications involving the potential contacts with respect to the at least one opportunity, based on at least a at least a short term cost-utility function dependent on at least the plurality of first characteristics and the at least one second characteristic for each respective opportunity, wherein a communication involving a respective potential contact with respect to a respective opportunity produces an expected change in at least one of the plurality of characteristics and an expected change in the utility value of the plurality of first characteristics, said optimization being responsive to the short term cost-utility function and the expected change in the utility value of the plurality of first characteristics; and
outputting at least one set defining potential communications involving the potential contacts with respect to the at least one opportunity, based on the optimization by the at least one automated data processor.

19. The method according to claim 18, wherein the plurality of first characteristics comprise skills, and the expected change in the at least one of the plurality of first characteristics comprises an improvement in at least one skill.

20. The method according to claim 18, wherein the at least one opportunity comprises a plurality of opportunities, each respective opportunity having a plurality of second characteristics, wherein the optimization by the at least one automated data processor is further responsive to a weighting applied to an importance of a selection criteria.

* * * * *